(12) United States Patent
Kloba et al.

(10) Patent No.: US 7,873,353 B2
(45) Date of Patent: Jan. 18, 2011

(54) METHOD AND SYSTEM FOR ACCESSING APPLICATIONS AND DATA, AND FOR TRACKING OF KEY INDICATORS ON MOBILE HANDHELD DEVICES

(75) Inventors: David Kloba, Sunnyvale, CA (US); Andrew Velline, Redwood City, CA (US); Linda Wei, San Francisco, CA (US); Robert W. Baynes, Jr., Hingham, MA (US); Ramandeep Sethi, Fremont, CA (US)

(73) Assignee: iAnywhere Solutions, Inc., Dublin, CA (US)

( * ) Notice: Subject to any disclaimer, the term of this patent is extended or adjusted under 35 U.S.C. 154(b) by 1440 days.

(21) Appl. No.: 10/673,548

(22) Filed: Sep. 30, 2003

(65) Prior Publication Data
US 2005/0070259 A1 Mar. 31, 2005

(51) Int. Cl.
*H04M 1/725* (2006.01)
(52) U.S. Cl. .................... 455/412.2; 370/503; 370/350; 455/412.1
(58) Field of Classification Search .............. 455/414.2, 455/414.1, 456.5, 566; 709/203, 201, 213
See application file for complete search history.

(56) References Cited

U.S. PATENT DOCUMENTS 5,349,678 A 9/1994 Morris et al.

(Continued)

FOREIGN PATENT DOCUMENTS

EP 0 714 066 A2 5/1996

(Continued)

OTHER PUBLICATIONS

"Method for bookmarking web pages of temporary interest," Research Disclosure, RD429108, Disclosed by Ericsson, Inc., Jan. 2000, Kenneth Mason Publications, Ltd., http://www.researchdisclosure.com, 1 page.

(Continued)

*Primary Examiner*—Ajit Patel
(74) *Attorney, Agent, or Firm*—Sterne, Kessler, Goldstein & Fox P.L.L.C.

(57) ABSTRACT

A method, system, and apparatus for accessing data-driven websites and applications on a mobile client device are described. A request for a website received from the mobile client device is transmitted to a provider. At least one web page template of the website and application data corresponding to the at least one web page template is received from the provider in response to the request, and is transmitted to the mobile client device. Thereafter, in an offline mode, the mobile client device can display a plurality of web pages corresponding to the website, each web page displaying corresponding data of the application data formatted according to a common format provided by the at least one web page template. Furthermore, a method, system, and apparatus for tracking the usage of applications on a mobile client device is provided. The occurrence of at least one user initiated event on the mobile client device during offline operation is enabled. Usage data corresponding to the occurrence of the user initiated event(s) is stored on the mobile client device. The mobile client device is synchronized with a server. The usage data is transmitted to the server.

36 Claims, 18 Drawing Sheets

U.S. PATENT DOCUMENTS

| | | |
|---|---|---|
| 5,377,326 A | 12/1994 | Murata et al. |
| 5,392,390 A | 2/1995 | Crozier |
| 5,410,543 A | 4/1995 | Seitz et al. |
| 5,426,594 A | 6/1995 | Wright et al. |
| 5,666,530 A | 9/1997 | Clark et al. |
| 5,666,553 A | 9/1997 | Crozier |
| 5,673,322 A | 9/1997 | Pepe et al. |
| 5,684,828 A | 11/1997 | Bolan et al. |
| 5,684,990 A | 11/1997 | Boothby |
| 5,694,546 A | 12/1997 | Reisman |
| 5,727,129 A | 3/1998 | Barrett et al. |
| 5,727,159 A | 3/1998 | Kikinis |
| 5,727,202 A | 3/1998 | Kucala |
| 5,732,074 A | 3/1998 | Spaur et al. |
| 5,740,364 A | 4/1998 | Drerup |
| 5,754,774 A | 5/1998 | Bittinger et al. |
| 5,768,511 A | 6/1998 | Galvin et al. |
| 5,790,977 A | 8/1998 | Ezekiel |
| 5,794,259 A | 8/1998 | Kikinis |
| 5,799,063 A | 8/1998 | Krane |
| 5,802,292 A | 9/1998 | Mogul |
| 5,805,807 A | 9/1998 | Hanson et al. |
| 5,809,242 A | 9/1998 | Shaw et al. |
| 5,813,007 A | 9/1998 | Nielsen |
| 5,832,489 A | 11/1998 | Kucala |
| 5,850,517 A | 12/1998 | Verkler et al. |
| 5,862,339 A | 1/1999 | Bonnaure et al. |
| 5,862,346 A | 1/1999 | Kley et al. |
| 5,864,676 A | 1/1999 | Beer et al. |
| 5,873,100 A | 2/1999 | Adams et al. |
| 5,877,766 A | 3/1999 | Bates et al. |
| 5,881,234 A | 3/1999 | Schwob |
| 5,884,323 A | 3/1999 | Hawkins et al. |
| 5,890,158 A | 3/1999 | House et al. |
| 5,895,471 A | 4/1999 | King et al. |
| 5,896,502 A | 4/1999 | Shieh et al. |
| 5,906,657 A | 5/1999 | Tognazzini |
| 5,917,491 A | 6/1999 | Bauersfeld |
| 5,918,013 A | 6/1999 | Mighdoll et al. |
| 5,918,237 A | 6/1999 | Montalbano |
| 5,919,247 A | 7/1999 | Van Hoff et al. |
| 5,922,045 A | 7/1999 | Hanson |
| 5,928,329 A | 7/1999 | Clark et al. |
| 5,937,163 A | 8/1999 | Lee et al. |
| 5,943,676 A | 8/1999 | Boothby |
| 5,946,697 A | 8/1999 | Shen |
| 5,948,066 A | 9/1999 | Whalen et al. |
| 5,953,392 A | 9/1999 | Rhie et al. |
| 5,954,795 A | 9/1999 | Tomita et al. |
| 5,961,601 A | 10/1999 | Iyengar |
| 5,961,602 A | 10/1999 | Thompson et al. |
| 5,974,238 A | 10/1999 | Chase, Jr. |
| 5,978,828 A | 11/1999 | Greer et al. |
| 5,978,833 A | 11/1999 | Pashley et al. |
| 5,978,842 A | 11/1999 | Noble et al. |
| 5,987,454 A | 11/1999 | Hobbs |
| 5,987,476 A | 11/1999 | Imai et al. |
| 5,987,499 A | 11/1999 | Morris et al. |
| 5,991,800 A | 11/1999 | Burke et al. |
| 6,000,000 A | 12/1999 | Hawkins et al. |
| 6,006,231 A | 12/1999 | Popa |
| 6,006,274 A | 12/1999 | Hawkins et al. |
| 6,009,462 A | 12/1999 | Birrell et al. |
| 6,012,083 A | 1/2000 | Savitzky et al. |
| 6,021,433 A | 2/2000 | Payne et al. |
| 6,023,698 A | 2/2000 | Lavey, Jr. et al. |
| 6,023,701 A | 2/2000 | Malik et al. |
| 6,023,708 A | 2/2000 | Mendez et al. |
| 6,026,474 A | 2/2000 | Carter et al. |
| 6,029,175 A | 2/2000 | Chow et al. |
| 6,029,195 A | 2/2000 | Herz |
| 6,032,162 A | 2/2000 | Burke |
| 6,035,324 A | 3/2000 | Chang et al. |
| 6,041,360 A | 3/2000 | Himmel et al. |
| 6,049,821 A | 4/2000 | Theriault et al. |
| 6,052,735 A | 4/2000 | Ulrich et al. |
| 6,058,416 A | 5/2000 | Mukherjee et al. |
| 6,061,718 A | 5/2000 | Nelson |
| 6,065,051 A | 5/2000 | Steele et al. |
| 6,065,059 A | 5/2000 | Shieh et al. |
| 6,070,184 A | 5/2000 | Blount et al. |
| 6,076,109 A | 6/2000 | Kikinis |
| 6,085,192 A | 7/2000 | Mendez et al. |
| 6,119,167 A | 9/2000 | Boyle et al. |
| 6,122,658 A | 9/2000 | Chaddha |
| 6,131,096 A | 10/2000 | Ng et al. |
| 6,148,330 A | 11/2000 | Puri et al. |
| 6,161,146 A | 12/2000 | Kley et al. |
| 6,167,255 A | 12/2000 | Kennedy, III et al. |
| 6,195,692 B1 | 2/2001 | Hsu |
| 6,209,027 B1 | 3/2001 | Gibson |
| 6,209,111 B1 | 3/2001 | Kadyk et al. |
| 6,219,696 B1 | 4/2001 | Wynblatt et al. |
| 6,226,650 B1 | 5/2001 | Mahajan et al. |
| 6,236,991 B1 | 5/2001 | Frauenhofer et al. |
| 6,341,316 B1 | 1/2002 | Kloba et al. |
| 6,421,717 B1 * | 7/2002 | Kloba et al. ............... 709/219 |
| 6,553,412 B1 | 4/2003 | Kloba et al. |
| 6,560,604 B1 | 5/2003 | Fascenda |
| 6,779,042 B1 | 8/2004 | Kloba et al. |
| 6,839,744 B1 | 1/2005 | Kloba et al. |
| 7,000,032 B2 | 2/2006 | Kloba et al. |
| 2002/0156838 A1 * | 10/2002 | Batke et al. .............. 709/203 |
| 2002/0161826 A1 * | 10/2002 | Arteaga et al. ........... 709/203 |
| 2003/0028563 A1 * | 2/2003 | Stutz et al. ............... 707/513 |
| 2003/0050995 A1 * | 3/2003 | Mateos ..................... 709/217 |
| 2003/0149682 A1 * | 8/2003 | Earley et al. ................. 707/1 |
| 2004/0268231 A1 * | 12/2004 | Tunning .................... 715/513 |
| 2005/0171762 A1 * | 8/2005 | Ryan et al. ................ 704/200 |

FOREIGN PATENT DOCUMENTS

| | | |
|---|---|---|
| EP | 0 848 339 A1 | 6/1998 |
| EP | 0 876 034 A2 | 11/1998 |
| EP | 0876034 A2 * | 11/1998 |
| EP | 0 944 009 A2 | 9/1999 |
| EP | 1 061 458 A2 | 12/2000 |
| WO | WO 94/12938 A1 | 6/1994 |
| WO | WO 97/04389 A1 | 2/1997 |
| WO | WO 98/34203 A1 | 8/1998 |
| WO | WO 98/34422 A2 | 8/1998 |
| WO | WO 99/22322 A1 | 5/1999 |
| WO | WO 99/35802 A2 | 7/1999 |
| WO | WO 00/14625 A1 | 3/2000 |

OTHER PUBLICATIONS

"Appointments Off by One Hour After Synchronization," http://support.microsoft.com/support/kb/articles/q195/5/79.asp, last reviewed Sep. 2, 1999, provided by Microsoft Product Support Services, 1 page.

"Russian Nino Computer," http://webideas.com/russian/systems/nino301.htm, last visited Jul. 25, 2000, Web Ideas Int'l Co., 1 page.

"512KB Organizer w/Synchronization," http://www.codemicro.com/fs/p11109.html, last visited Jul. 25, 2000, codemicro.com, 1 page.

"Synchronization Between Your Handheld PC and Desktop PC," http://www.microsoft.com/MOBILE/hpc/features/synch.asp, last visited Jul. 25, 2000, Microsoft, Inc., 1 page.

"Puma Adds Security to Wireless Syncing Software," http://devices.internet.com/news/q29908/990802puma/990802puma.html, last visited Jul. 25, 2000, Copyright 1999, internet.com Corp., 1 page.

"iMobile Data Synchronization Replicates Mobile Databases," http://www.synchrologic.com/about/about_imobile_data_synchronization.html, 2 pages, last visited Jul. 25, 2000, Synchrologic, Inc.

"WeSync.com Previews Wireless Synchronization Solution for Handheld Computers: Collaborative Service for Handheld Users Moves Into Public Beta Today: Wireless Refresh (TM) Lets Users Perform Narrow Bandwidth Wireless Syncs," http://www.palmsizepc.com/oct99-20-1.html, last visited Jul. 25, 2000, 3 pages, WeSync.com, Inc.

"XTNDConnect Server White Papers," http://www.extendsys.com/prodinfo/white/serversync/, last visited Jul. 25, 2000, 1 page, Extended Systems, Inc.

"Introduction to Wireless Internet & Mobile Computing Market," Copyright 1999, Wireless Internet & Mobile Computing, http://www.wirelessinternet.com/introto1.htm, last visited Jul. 24, 2000, 4 pages.

"Databites," http://www.databites.com/company_info.htm, Databites Corporation, 2 pages, last visited Jul. 26, 2000.

Tools for the TEKS: Integrating Technology in the Classroom: "Offline Web Browsing=No More Excuses!," Copyright 1998, Wesley A. Fryer, last visited Jun. 22, 2000, http://www.wtvi.com/teks/article4.html, 9 pages.

Story, Derrick "Palm Browsing," Miller-Freeman, Inc., Jul. 30, 1999, http://www.webreview.com/pub/1999/07/30/feature/index.html, 2 pages.

Shultz, Greg "Take Advantage of Offline Browsing Tools: Learn to browse Web site content without being connected to the Internet," last visited Jun. 22, 2000, http://www.zdnet.com/zdhelp/stories/main/0,5594,2395480.00.html, Copyright 2000, ZD Inc., 2 pages.

Dalrymple, Jim "Palm-like Internet appliance on the way from 3Com,", Mar. 27, 2000, http://www.maccentral.com/news/0003/27.palm.shtml, Mac Publishing LLC, 3 pages.

"Offline Reading," http://www.microsoft.com/windows/le/Features/offline.asp, last updated Mar. 18, 1999, Microsoft Corporation, 1 page.

"InContext FlashSite," http://ipw,internet.com/clients_servers/offline_browsers/916161991.html, internet.com Corporation, Jan. 12, 1999, 2 pages.

"AvantGo Enterprise™," http://avantgo.com/enterprise/products/index.html, Copyright 2000 AvantGo, Inc., 2 pages, last visited Jun. 21, 2000.

"PalmPilot Software Programming and Development," http://www.pencomputersolutions.com/, Pen Computer Solutions, Inc., 4 pages, last edited Jun. 16, 2000.

"Pocket Browser 1.52 for Palm-size PC," http://www.ceshopper.com/ceshopper/pocketbrowser.html, Copyright 2000 CEShopper.com, last visited Jun. 22, 2000, 1 page.

"Answers & Tips: Browse the Web on Any Palm," http://web.zdnet.com/zdtv/screensavers/answerstips/story/0,3656,2408515,00.html, 2 pages, Copyright 1997-2000, ZDTV LLC, last visited Jun. 22, 2000.

"Palm Announces Mobile Internet Kit, Linking Palm Handhelds With Mobile Phones for Wireless Web Connectivity: New Web Clipping Applications to Provide Out-of-the-box Access to Leading Internet Content," http://biz.yahoo.com/bw/000627/ny_palm_2.html, Yahoo!, Jun. 27, 2000, 3 pages.

"GoAmerica Licenses Oracle Platform," http://www.allnetdevices.com/wireless/news/2000/06/27/goamerica_licenses.html, internet.com Corp, Jun. 27, 2000, 2 pages.

"ProxiWeb," http://aolcom.cnet.com/downloads/0-10126-100-1757359.html?tag=st.dl.10126_106_1.1st.td, Apr. 25, 2000, CNET Networks, Inc., 2 pages.

Wilcox, Joe, "IBM aims to put computers on the wrist," http://cnet.com/news/0-1006-200-2160685.html, CNET Networks, Inc., Jun. 27, 2000, 3 pages.

Portable Internet, http://www.portableinternet.com/, Copyright 2000, Portable Internet, Inc., last visited Jul. 5, 2000, 1 page.

BravuraNet, http://www.bravurnet.com Copyright 2000, BravuraNet, last visited Jul. 13, 2000, 1 page.

"HotLinks: Store Bookmarks Online," http://www.zdnet.com/pcmag/stories/firstlooks/0,67632403245,00.html, Dec. 3, 1999, ZD Inc., 2 pages.

"MyBookmarks™," http://www.mybookmarks.com, Copyright 2000, MyBookmarks.com, LLC, last visited Jul. 13, 2000, 1 page.

Press Release, "AvantGo Presents Mobile Computing Software at Herring On the Enterprise: Organizations such as Grenley-Stewart Resources and Rosenbluth International Already Reaping Benefits," 1 page, Apr. 6, 1998, AvantGo, Inc.

Press Release, "AvantGo to Demonstrate New Enterprise Applications for the 3Com® PalmPilot™ Connected Organizer at Seybold '98: Applications Enable Networked Digital Workflows for Publishing Environments," 2 pages, Mar. 17, 1998, AvantGo, Inc.

Press Release, "AvantGo Software Extends Enterprise Applications to Handheld Devices: New Company Provides Instant Access to Essential Information for Mobile Professionals," 3 pages, Feb. 17, 1998, AvantGo, Inc.

Press Release, "Visto and AvantGo Team to Extend Web-Based Personal Content to Palm Pilot and Windows CE Devices: Visto Briefcase Will Leverage AvantGo 2.0 for Mobile Workforce," 2 pages, Sep. 21, 1998, AvantGo, Inc.

Press Release, "UpShot Partners with AvantGo to Display Latest Sales Data on Handhelds: Field Sales Representatives Will Have the Power of Sales Automation at Their Fingertips," 2 pages, Sep. 21, 1998, AvantGo, Inc.

Press Release, "AvantGo Announces Business Partner Program: VARs,Systems Integrators, Distributors and Consultants to Deliver Enterprise Applications for Handheld Computers," 2 pages, Sep. 21, 1998, AvantGo, Inc.

Press Release, "Industry Bigshots and Upstarts Rally Around AvantGo 2.0: Microsoft, IBM, Oracle, Symbol Technologies and Palm Computing Support AvantGo," 3 pages, Sep. 21, 1998, AvantGo, Inc.

Press Release, "Novatel Wireless and AvantGo Team Up to Provide Corporate Information to Wirelessly-Enabled Handhelds: Minstrel Modem and AvantGo 2.0 Extend Enterprise Connectivity," 2 pages, Sep. 21, 1998, AvantGo, Inc.

Press Release, "AvantGo Releases AvantGo 2.0—The Definitive Enterprise Solution for Managing Mobile Information: New Product Offering Provides Centralized Administration, Universal Remote Access and Mobile Transactions Between Corporate Databases and Handhelds," 3 pages, Sep. 21, 1998, AvantGo, Inc.

Press Release, "Casio Announces Support for AvantGo: AvantGo to Deliver Enterprise Applications for Casio's Windows CE-Compatible Devices," 2 pages, Sep. 21, 1998, AvantGo, Inc.

Press Release, AvantGo Integrated Into Pocket Internet Explorer for Pocket PCs: AvantGo Available on New Pocket PC Devices from Casio, Compaq, Hp and Symbol Technologies, 3 pages, Apr. 19, 2000, AvantGo, Inc.

Press Release, "AvantGo Completes $31 Million Mezzanine Financing: Goldman Sachs, American Express, Ford Motor Company, McKessonHBOC and Research in Motion (RIM) Accelerate Growth of Business-to-Business Mobile Internet Company," 2 pages, Apr. 17, 2000, AvantGo, Inc.

Press Release, "AvantGo Empowers BG's Leading Lights with Mobile Intranet and Internet Access: Mobile Software gives International Energy Company an Advantage in Customer care and Business Management," 3 pages, Apr. 4, 2000, AvantGo, Inc.

Press Release, "AvantGo Embraces Macintosh Community: AvantGo Delivers Free Mobile Internet Service to Macintosh Users," 2 pages, Mar. 27, 2000, AvantGo, Inc.

Press Release, "AvantGo Joins GPRS Application Alliance: AvantGo Teams up with Ericsson to support Wireless Standards for Mobile Devices," 2 pages, Feb. 28, 2000, AvantGo, Inc.

Press Release, "AvantGo Integrated in Microsoft's Internet Explorer for the Pocket PC: Out of the Box, Mobile Users Gain Access to the Mobile Internet via Pocket Internet Explorer and AvantGo," 2 pages, Feb. 24, 2000, AvantGo, Inc.

Press Release, "AvantGo Joins Motorola Web w/o Wires Alliance Program: AvantGo Now Easily Accessible from Motorola Web Phones," 2 pages, Feb. 24, 2000, AvantGo, Inc.

Press Release, "AvantGo Optimizes User Experience on Palm IIIc™ Handheld Computers: With enhanced image support from AvantGo, Users Can View Web-Based Photos and Graphics in Color on New Devices," 2 pages, Feb. 24, 2000, AvantGo, Inc.

Press Release, "AvantGo.Com Bolsters Business Channels: New relationships with Business Week, Infonautics, The Economist, Fidelity Investments and The Financial News among the more than 80 Optimized AvantGo.com Business Channels for Mobile Device Users," 2 pages, Feb. 16, 2000, AvantGo, Inc.

Press Release, "Leading Labels and Music Sites Go Mobile With AvantGo.Com: Columbia Records, Universal's Interscope Geffen A&M, Ticketmaster Online-CitySearch's LiveDaily.com and Milor Entertainment Group join Amazon.com and mySimon.com to bring the Music Industry to Mobile Devices," 2 pages, Feb. 14, 2000, AvantGo, Inc.

Press Release, "AvantGo Names Head of Dell Online, Richard Owen, CEO: Mobile Computing Leader Bolsters Management Team With Key New Hires," Jan. 25, 2000, AvantGo, Inc.

Press Release, "AvantGo Expands Relationship with InfoSpace.com: AvantGo to offer InfoSpace.com's Mobile Private Label Portals to Users of Palm Computing Platform, Windows CE and Wireless PDAs," 2 pages, Jan. 18, 2000, AvantGo, Inc.

Press Release, "AvantGo.Com Available to Macintosh Users," Jan. 5, 2000, AvantGo, Inc.

Press Release, "Verian Technologies and AvantGo Team Up to Resell Mobile Procurement Application: Bundled Software Package from Verian Provides Improved Inventory Management for Mobile Professionals," 2 pages, Jan. 3, 2000, AvantGo, Inc.

Press Release, "AvantGo Drives Healthcare Market Adoption of Handheld Devices: CHW, Mass General, McKessonHBOC, US Surgical, Norton Healthcare, Handheldmed.com, FitForAll.com and Asimba.com Select AvantGo to Deliver Critical Health Information to Mobile Devices," 3 pages, Dec. 14, 1999, AvantGo, Inc.

Press Release, "AvantGo Announces New AvantGo Enterprise Publisher: Mobile Leader Expands Enterprise Offerings to Extend Corporate Web Content to Mobile Devices," 2 pages, Dec. 6, 1999, AvantGo, Inc.

Press Release, "Go Network Delivers Mobile Solutions with AvantGo: Partnership to Give Wireless Users Access to GO Network Anytime, Anywhere," 2 pages, Nov. 11, 1999, AvantGo, Inc.

Press Release, "AvantGo Delivers Award-Winning Mobile Computing Software and Popular Consumer Internet Service to Europe: Company Expands into Europe; Phillip Hibberd to Head European Operations," 2 pages, Nov. 1, 1999, AvantGo, Inc.

Press Release, "AvantGo Mobile Unity Brings the Web to Wireless Devices: Mobile Computing Leader Brings the Web to Internet-enabled Phones and Wireless Handheld Devices; Integrates with Wireless Solutions," 4 pages, Oct. 25, 1999, AvantGo, Inc.

Press Release, Leading Mobile Computing Companies Form Industry Association: Puma, Aether Systems, Attachmate, AvantGo, Certicom, Globalware, Epocrates and the Windward Group Establish Mobile Application Link Forum to Advance and Promote Open Source Communications Protocol for Networked Applications, 3 pages, Oct. 18, 1999, AvantGo, Inc.

Press Release, "AvantGo Ships with New Special Edition PalmVx™ Organizer," 2 pages, Oct. 13, 1999, AvantGo, Inc.

Press Release, "FT.Com and AvantGo Put the Latest International Business News in the Palm of Your Hand," 2 pages, Oct. 4, 1999, AvantGo, Inc.

Press Release, "Amazon.com First to Join AvantGo.com E-Commerce Initiative," 2 pages, Oct. 4, 1999, AvantGo, Inc.

Press Release, "AvantGo Teams With HP: AvantGo.com Now Available on the New HP Jornada 430se Palm-size PC," 2 pages, Sep. 27, 1999, AvantGo, Inc.

Press Release, "Sony Online Entertainment and AvantGo Announce Jeopardy! 2001 Online to be Delivered to Users of Handheld Devices: The Station @sony.com ventures beyond the Internet to extend distribution," 2 pages, Sep. 20, 1999, AvantGo, Inc.

Press Release, "AvantGo.com Scales to Showcase the Power of AvantGo Enterprise 3: Free Interactive Service Delivers More Than 15 Million Web Pages Daily to Hundreds of Thousands of Users," 2 pages, Sep. 7, 1999, AvantGo, Inc.

Press Release, "AvantGo Enterprise 3 Breaks Barrier Between Enterprise and Handhelds: Attachmate Corporation and AvantGo enter Into Business Alliance," 3 pages, Sep. 7, 1999, AvantGo, Inc.

Press Release, "AvantGo Signs CFO Thomas Hunter: Former IBM and First Data Corp. Executive Joins Leading Handheld Software Provider," 1 page, Aug. 23, 1999, AvantGo, Inc.

Press Release, Microsoft and AvantGo Deliver Personalized Content from Slate to AvantGo.com: Customized Information from Slate Now Available to Users of Palm OS- and Windows CE-Based Handheld Devices Through AvantGo.com, 2 pages, Aug. 9, 1999, AvantGo, Inc.

Press Release, "Salon.com to Provide Content for Palm Pilots and other Handheld Devices through AvantGo.com: News, Technology and other content from Salon.com now available to over 300,000 AvantGo.com subscribers," 2 pages, Jul. 26, 1999, AvantGo, Inc.

Press Release, "WisdomWare Partners with AvantGo to Provide Handheld Marketing and Sales Intelligence Solution: Reseller Agreement Enables Planned WisdomWare AnyWhere™ Service," 2 pages, Jul. 26, 1999, AvantGo, Inc.

Press Release, "Ontheroad.com Snapshots Double Every Two Weeks with AvantGo.com," 2 pages, Jul. 19, 1999, AvantGo, Inc.

Press Release, "AvantGo Partners with Vicinity to Provide Mapblast! Maps and directions to Handheld Device Users Through AvantGo.com," 2 pages, Jun. 28, 1999, AvantGo, Inc.

Press Release, "Microsoft and 3Com Invest in AvantGo: Mobile Computing Leader takes $14.7 Million in Third Round Funding from Microsoft, 3Com, Fayez Sarofim & Co., $21^{st}$ Century Internet Venture Partners, H & Q Venture Associates and Adobe Ventures," 3 pages, Jun. 18, 1999, AvantGo, Inc.

Press Release, "AvantGo Teams with The Wall Street Journal Interactive Edition to Introduce New Personalized Content for AvantGo.com: AvantGo.com Provides News Services to PalmOS and Windows CE handheld users," 2 pages, May 17, 1999, AvantGo, Inc.

Press Release, "AvantGo.com Bolstered by Name Brand Handheld Makers, Wireless Providers and Content Publishers: Microsoft, Phillips, Casio, IBM, AT&T Wireless, GoAmerica, Novatel Wireless and Others Endorse Interactive Service with 100 Optimized Channels from Leading Content Providers," 6 pages, May 10, 1999, AvantGo, Inc.

Press Release, "AvantGo Unleashes AvantGo.com, the First Free Interactive Service for Mobile Device Users: New Personalized Service Puts the Power of the Web in the Palm of Your Hand," 3 pages, May 10, 1999, AvantGo, Inc.

Press Release, "David Harris Joins AvantGo as Vice President of Worldwide Sales and Business Development: Former Member of Adobe Senior Management Signs on with Industry-Leading Mobile Computing Company," 2 pages, Apr. 19, 1999, AvantGo, Inc.

Press Release, "AvantGo Logo Created by 1185 Design Recognized as Outstanding: Design Receives Prestigious Communications Arts (CA) Magazine Award; Logo to Appear in CA and American Corporate Identity Publications," 1 page, Mar. 29, 1999, AvantGo, Inc.

Press Release, "AvantGo Licenses Certicom's SSL Plus for Embedded Systems: Advanced Certicom security Technology now Available to Mobile Enterprise customers Using AvantGo with Windows CE and Palm Computing handhelds," 2 pages, Apr. 13, 1999, AvantGo, Inc.

Press Release, "AvantGo Integrates Seamlessly with New Minstrel III by Novatel Wireless: Interactive Wireless Data Capabilities Allow Real-time Access to Critical Information on Palm Computing Platform Devices," 2 pages, Apr. 16, 1999, AvantGo, Inc.

Press Release, "AvantGo and Microsoft Silicon Valley Developer Center to Offer Free Seminars to Enterprises Interested in Extending Applications to Windows CE-Based Devices: Attendees Can Register Today for Technical Sessions on Apr. 26-27 and May 24-25," 2 pages, Mar. 16, 1999, AvantGo, Inc.

Press Release, "AvantGo and the Windward Group Offer Free Seminars to Enterprises Interested in Extending Applications to Mobile Devices: Attendees Can Register Today for Bay Area Sessions on Apr. 28 & 29," 2 pages, Mar. 15, 1999, AvantGo, Inc.

Press Release, "AvantGo Recognized Again for Execllence in Mobile Computing: Mobile Insights Chooses AvantGo as Best Mobile Computing Solution in "Wireless Internet and Intranet" Category," 2 pages, Mar. 8, 1999, AvantGo, Inc.

Press Release, "AvantGo and Puma Deliver Open Source Code for Handheld-to-Server Connectivity: Microsoft, Sybase and Symbol Support Mobile Application Link as Key to Corporate Handheld Market Growth," 2 pages, Mar. 1, 1999, AvantGo, Inc.
Press Release, "AvantGo Takes Home Seven Leading Industry Awards: Hot Mobile Computing Software Company Recognized During 1998 for Creativity, Innovation and Candor," Feb. 8, 1999, AvantGo, Inc.
Press Release, "AvantGo Receives Two Awards from Tap Magazine," 1 page, Feb. 26, 1999, AvantGo, Inc.
Press Release, "Symbol Technologies and AvantGo Announce Relationship To Provide Barcode Scanning Web Client on Symbol's New Palm Terminals," 2 pages, Feb. 1, 1999, AvantGo, Inc.
Press Release, "AvantGo Announces Support for the Latest Version of Windows CE for the Palm-Size PC: Leader in Managing Mobile Information Allows its Growing Number of Users to Take Advantage of More Windows CE Functionality, Including Color," 2 pages, Feb. 1, 1999, AvantGo, Inc.
Press Release, "InfoSpace.com and AvantGo Deliver New Optimized Channels of Web Content to Handheld Devices: Companies introduce a comprehensive offering of Web content for handhelds," 2 pages, Jan. 28, 1999, AvantGo, Inc.
Press Release, "CNNfn and AvantGo Team Up to Help Users Keep Track of Breaking Business News on their Handheld Devices," 2 pages, Jan. 26, 1999, AvantGo, Inc.
Press Release, "CommerceNet Awards Ecommerce Innovation: AvantGo, Brokat, DealTime, eBay, and General Magic Receive Awards," Dec. 16, 1998, AvantGo, Inc.
Press Release, "AvantGo and Puma Technology Join Forces on Open Industry Initiative for Mobile Device/Corporate Enterprise Application Connectivity: Mobile Application Link Initiative Lauded as Key to Market Growth," 3 pages, Dec. 2, 1998, AvantGo, Inc.
Press Release, "The Sporting News to Deliver News, Scores to Handheld Devices: The Sporting News Teams with AvantGo to Offer In-Depth News, Analysis and Scores to Portable Platforms," 2 pages, Nov. 20, 1998, AvantGo, Inc.
Press Release, "Knight Ridder Real Cities and AvantGo Team up to Provide City Sites, News and Information on Handheld Computers: Visitors to Sites Have a Chance to Win Free Palm III Organizers in Introductory Contest," 2 pages, Nov. 18, 1998, AvantGo, Inc.
Press Release, "AvantGo and Oracle Team up to Deliver Mobile Applications to Handheld Devices: Combination of AvantGo and Oracle Lite Enables Unique Mobile Device Access to Oracle8i," 2 pages, Nov. 9, 1998, AvantGo, Inc.
Press Release, "Ziff-Davis and AvantGo Bring Award Winning Content From ZDNet.com to Handheld Devices," 2 pages, Oct. 26, 1998, AvantGo, Inc.
Press Release, "USA Today Online Partners with AvantGo to Deliver News, Sports & Money Briefs, Travel Tips and Dow Jones Charts to Users of Handheld Devices," 2 pages, Oct. 20, 1998, AvantGo, Inc.
Press Release, "IndustryWeek and AvantGo Team Up to Deliver Management Best Practices News and Information to Users of Handheld Devices," 2 pages, Oct. 6, 1998, AvantGo, Inc.
Press Release, "The Industry Standard and AvantGo Team Up to Deliver News to Portable Devices: New Business Publication Takes Advantage of Publishing Trend Toward New Delivery Formats," 2 pages, Aug. 24, 1998, AvantGo, Inc.
Press Release, "AT&T Executive Joins AvantGo Board of Directors: Robert J. Lesko Brings Global Services Expertise to Hot Start-Up," Aug. 10, 1998, AvantGo, Inc.
Press Release, "AvantGo Announces Agreement to Deliver News From The Wall Street Journal Interactive Edition to Handheld Computers," 2 pages, Aug. 3, 1998, AvantGo, Inc.
Press Release, "Get Your Five-Day Weather Forecast—On a Handheld: Weather24 and AvantGo Deliver "Weather to Go" Content for Mobile Computer Users," 2 pages, Jun. 29, 1998, AvantGo, Inc.
Press Release, "News America Digital Publishing Teams with AvantGo to Provide News, Sports, Business and Entertainment Information to Mobile Users," 2 pages, Jun. 22, 1998, AvantGo, Inc.
Press Release, "AvantGo Secures $3.5 Million in Venture Capital: Hambrecht & Quist, Adobe Ventures and $21^{st}$ Century Internet Venture Partners Invest; Chris Hollenbeck Joins AvantGo Board of Directors," 2 pages, Jun. 8, 1998, AvantGo, Inc.
Press Release, "AvantGo Signs Stuart Read As Vice President of Marketing: Past Founder of Diba Joins Fast Growing Mobile Computing Company," May 26, 1998, AvantGo, Inc.
Press Release. "AvantGo Teams with Leading Publishers to Serve Up News for Mobile Users: Wired Digital, The New York Times, Mercury Center, InfoWorld and CNET Deliver Content for HandHelds," 3 pages, May 18, 1998, AvantGo, Inc.
Press Release, "AvantGo Wins DBMS Magazine Editor's Choice Award: Hot Mobile Computing Software Start-Up Recoginzed for Creativity and Innovation," Apr. 20, 1998, AvantGo, Inc.
Press Release, "AvantGo Licenses Java Technology to Palm Computing for the Conduit Development Kit, Java Edition: Technology Extends Enterprise Java Applications to the 3Com Palm Pilot Connected Organizer," 2 pages, Mar. 23, 1998, AvantGo, Inc.
"Shop for Everything: Store Your Online Bookmarks or Favorites on the Web," http://www.shop-for-everything.com/freestuff/bookmarks-favorites.html, last visited Jul. 13, 2000, 1 page.
Lei, H. et al., "DataX: An Approach to Ubiquitous Database Access," $2^{nd}$ IEEE Workshop on Mobile Computing Systems and Applications (WMCSA), 1999 Proceedings, New Orleans, LA, Feb. 25-26, 1999, IEEE Comput Soc., Los Alamitos, CA, pp. 70-79.
Kalakota, R., "Information Supply-Chains and Webcasting: A Design Framework," Fourth International Workshop on Community Networking, Proceedings, 1997, Atlanta, GA, Sep. 11-12, 1997, IEEE, NY, NY, pp. 103-111.
Joshi A. et al., "On Disconnected Browsing of Distributed Information," Seventh International Workshop on Research Issues in Data Engineering, 1997 Proceedings, Birmingham, UK, Apr. 7-8, 1997, IEEE Comput. Soc., Los Alamitos, CA, pp. 101-107.
Cerami, Ethan. *Delivering Push*. New York: McGraw-Hill, 1998.

* cited by examiner

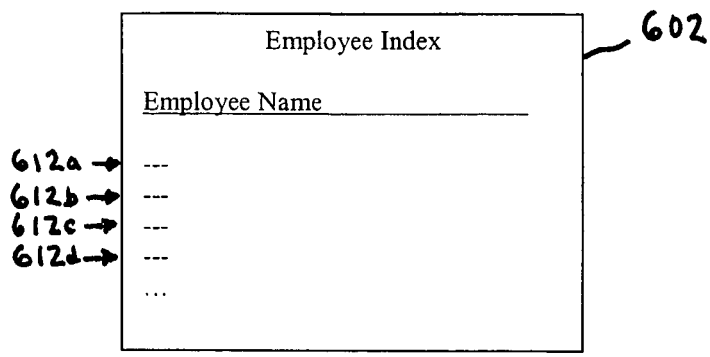
FIG. 6A
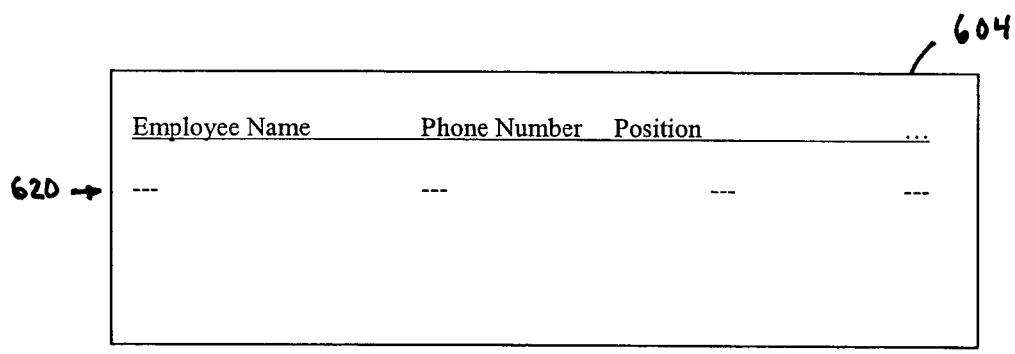
FIG. 6B
| 632 | 634 | 636 | 638 | 606 |
| Steve Jones | 301-555-2343 | Sales Representative | ... |
| Angela Peters | 301-554-2389 | Marketing Representative | ... |
| Gloria Smith | 301-555-9898 | Vice President | ... |
| Donovan Vick | 301-556-9879 | Information Technology | ... |
| ... | | | |
FIG. 6C

1100

1102 a request for a website received from the
mobile client device is transmitted to a provider

1104 at least one web page template of the website and application
data corresponding to the at least one web page template are
received from the provider in response to the request

1106 the at least one web page template and the application
data are transmitted to the mobile client device

2102
occurrence of at least one user initiated event on the mobile client device while the client device is operating offline is enabled 2104
usage data corresponding to the occurrence of at least one user initiated event on the mobile client device is stored 2106
the mobile client device is synchronized with a server, including the step of transmitting the usage data to the server 2108
at least one report is created from the usage data 2110
the at least one report is displayed

FIG. 21

METHOD AND SYSTEM FOR ACCESSING APPLICATIONS AND DATA, AND FOR TRACKING OF KEY INDICATORS ON MOBILE HANDHELD DEVICES

BACKGROUND OF THE INVENTION

1. Field of the Invention

The present invention relates to mobile handheld devices, and in particular, to synchronization of data on mobile handheld devices.

2. Background Art

Data-driven applications and websites are those that include the display of multiple pages of data, each page showing data elements formatted in a similar manner from page to page. Example data-driven applications and/or websites include: directories, including phone directories or directories of other personal, corporate, or client information; email tools (such as AOL, HOTMAIL, YAHOO! EMAIL, and others); financial tools; investment tools (such as ETRADE, AMERITRADE, and others); banking/checking tools (such as banking websites, QUICKEN, and others); etc.

Such applications and websites are currently made accessible on mobile devices by copying the entire application, or copying the pages of interest of the website to the mobile device. For example, if a mobile device desires to have access to a data-driven website for offline viewing, a copy of all the pages of interest of the website are transferred to the mobile device. If the website is updated, the website must be entirely re-transmitted to the mobile device. For a data-driven application, a special mobile version of the application and related data are copied to the mobile device. In either case, after transfer of the website or application to the mobile device, the mobile device can operate offline and view/interact with the website or application.

This practice, however, has its limitations. For example, a large amount of storage is required on the mobile device to store all of the downloaded web pages incorporating data, or to store the entire application and related data. Furthermore, transfer times for these web pages and applications to the mobile device can be long, including the initial transfer time required, and the time required to transfer updates to the website or application to the mobile device.

Thus, what is needed is a way to avoid the storage and transfer time problems that are present in conventional systems for accessing data-driven applications on mobile devices.

BRIEF SUMMARY OF THE INVENTION

In aspects of the present invention, methods, systems, apparatuses, and computer program products for enabling access to data driven websites on mobile client devices are described. According to the present invention, web page templates and associated application data are transferred from a provider to a mobile device to provide access to applications and websites offline. In the case of a website, instead of transferring all of the pages of interest to the mobile device, a smaller number of web page templates are transferred, along with the associated application data. In the case of an application, instead of copying an entire application to a mobile device, the application provider can generate a web page templates and application data for copying to the mobile device. The web page templates incorporate at least some of the functionality of the application, and allow viewing of the application data on the mobile device.

In a first aspect, a mobile client device is synchronized with a server. A request for a website is transmitted from the mobile client device to the server. At least one web page template and application data corresponding to the website are received from the server at the mobile client device in response to the request. A selected web page of the website is displayed on the mobile client device in an offline mode. Data of the application data that corresponds to the selected web page is displayed, formatted according to the at least one web page template.

In a further aspect, a script called by the at least one web page template can be executed to format the data for display on the mobile client device. For example, the script can be a Javascript, or other script type.

In a still further aspect, the mobile client device can be synchronized with the server a second time. A second request for the website can be transmitted from the mobile client device to the server. A changed portion of the at least one web page template and application data are received from the server at the mobile client device in response to the second request.

In an alternative aspect, a change to the web page template(s) and/or application data is made by a user at the mobile client device. The mobile client device is synchronized with the server. The change to the application data is transmitted from the mobile client device to the server.

In another aspect of the present invention, a server interfaces one or more providers with a mobile client device. The mobile client device is synchronized with the server. A request for a website received from the mobile client device is transmitted to a provider. At least one web page template of the website and application data corresponding to the at least one web page template is received from the provider in response to the request.

The at least one web page template and the application data are transmitted to the mobile client device. Thus, in an offline mode, the mobile client device can display a plurality of web pages corresponding to the website, each web page displaying corresponding data of the application data formatted according to a common format provided by the at least one web page template.

In another aspect of the present invention, a method, system, and apparatus for tracking the usage of applications on a mobile client device is described. The occurrence of at least one user initiated event on the mobile client device while the client device is operating offline is enabled. Usage data corresponding to the occurrence of at least one user initiated event on the mobile client device is stored. The mobile client device is synchronized with a server. The usage data is transferred to the server.

In a further aspect, at least one report is created from the usage data. The reports can be printed, viewed, or otherwise displayed.

These and other objects, advantages and features will become readily apparent in view of the following detailed description of the invention.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 6A and 6B relate to example web page templates, according to embodiments of the present invention.

FIG. 6C shows example application data, according to an embodiment of the present invention.

Figure 6D:
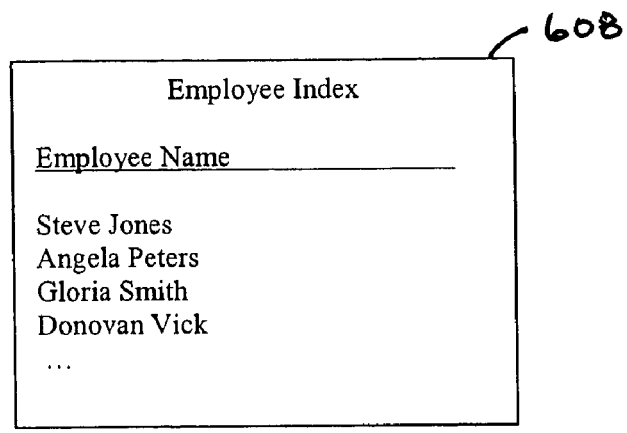
Figure 6E:
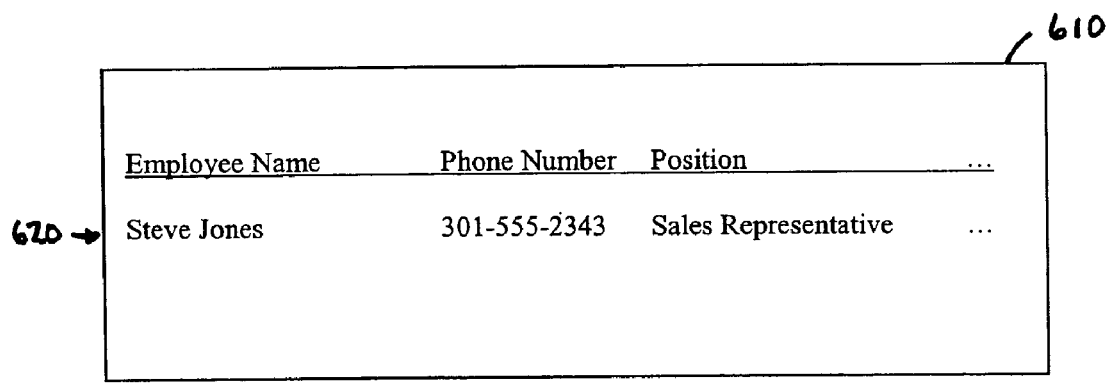

FIGS. 6D and 6E display web pages created from web page templates and application data, according to example embodiments of the present invention.

FIGS. 7-10 show block diagrams of example mobile computing environments, according to embodiments of the present invention.

Figure 11B:
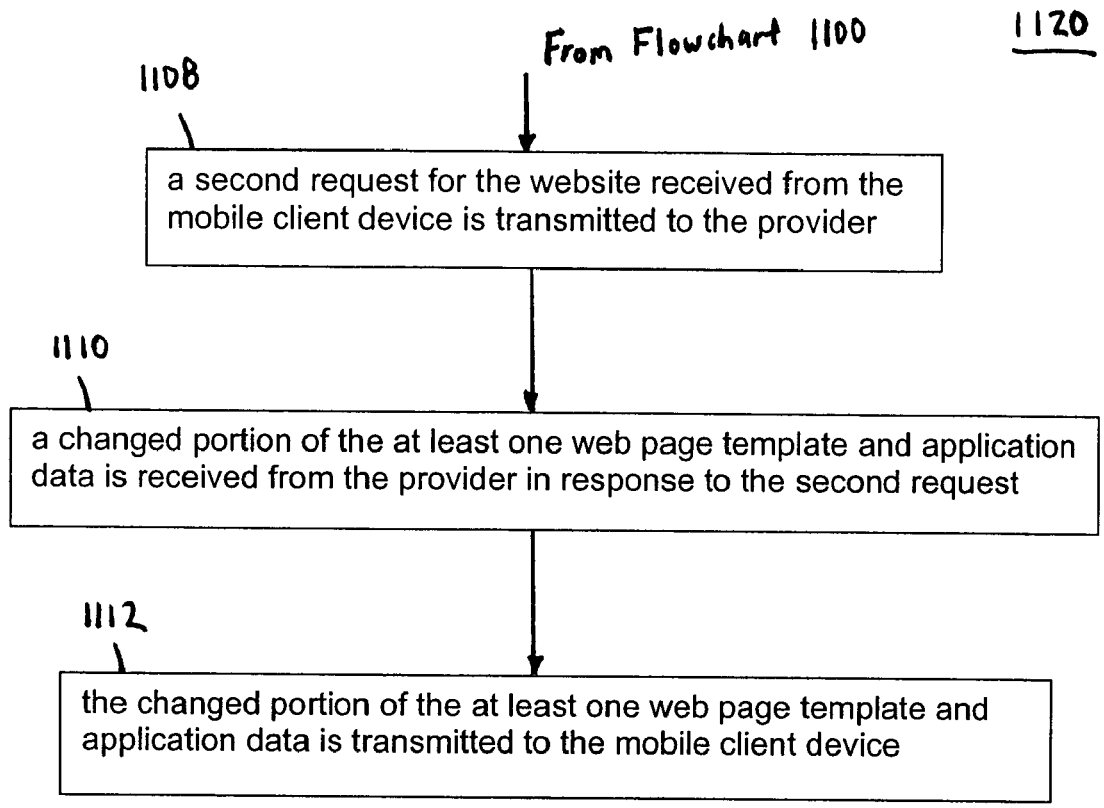
Figure 11C:
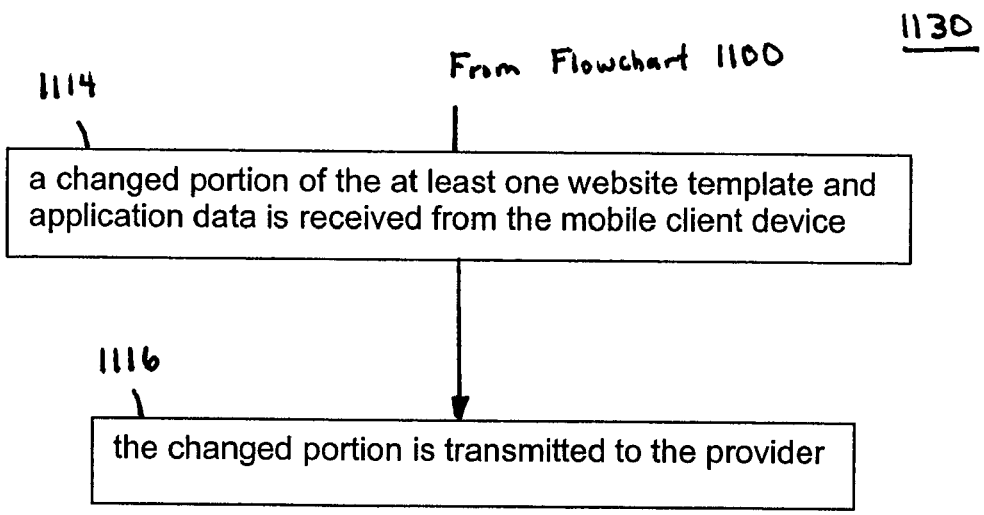

FIGS. 11A-11C show flowcharts providing example steps for managing the copy of a data-driven website from a provider, according to example embodiments of the present invention.

FIGS. 12-17 show example block diagrams relating to the flowcharts of FIGS. 11A-11C, illustrating operation of the present invention.

Figure 18A:
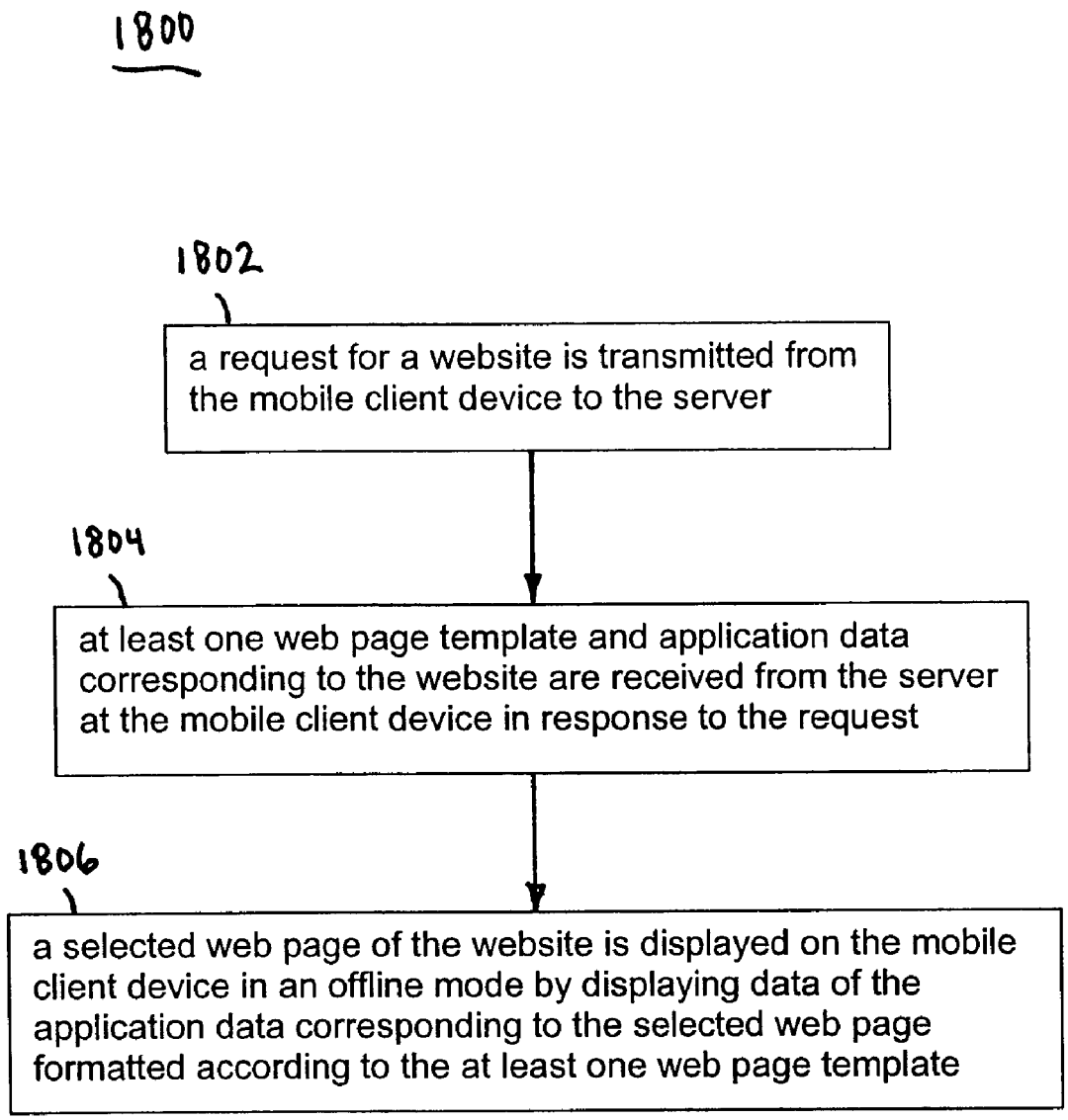
Figure 18B:
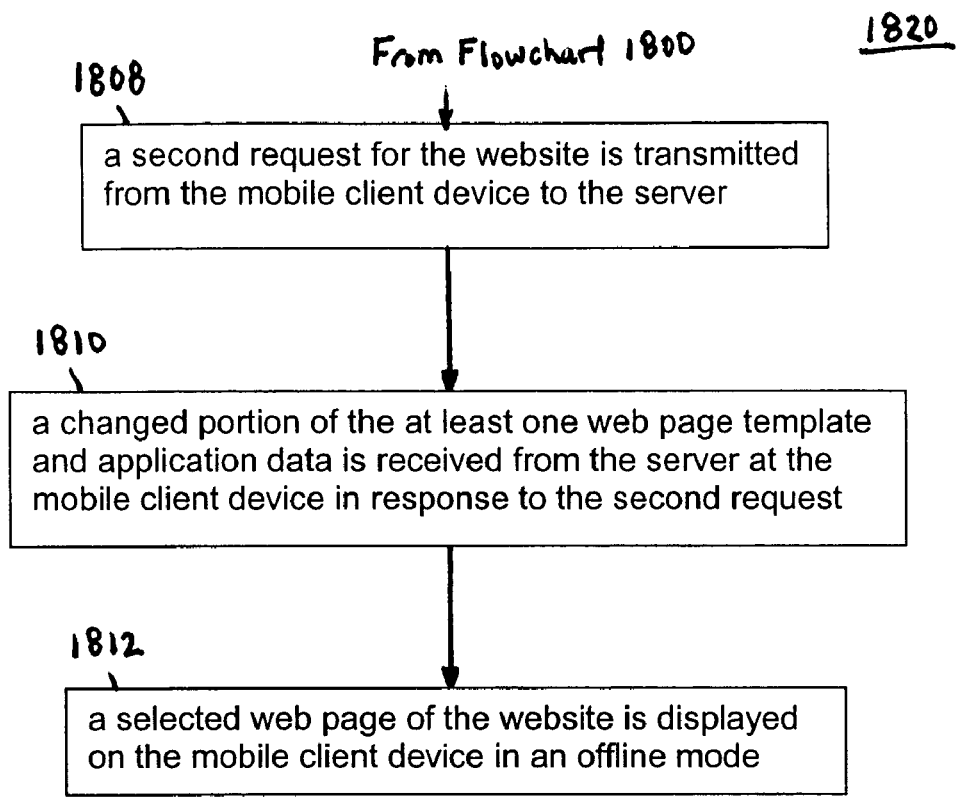
Figure 18C:
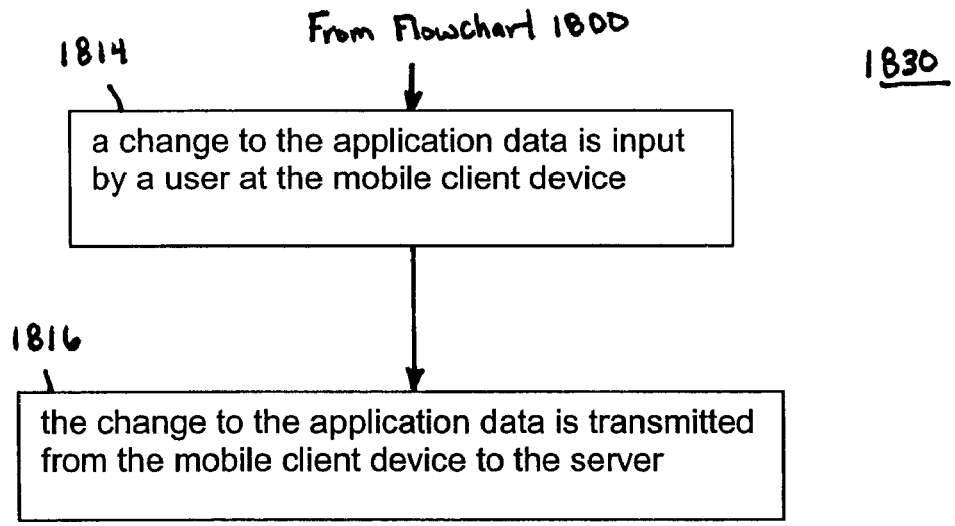

FIGS. 18A-18C show flowcharts providing example steps for copying and managing a data-driven website at a mobile client device, according to example embodiments of the present invention.

Figure 19:
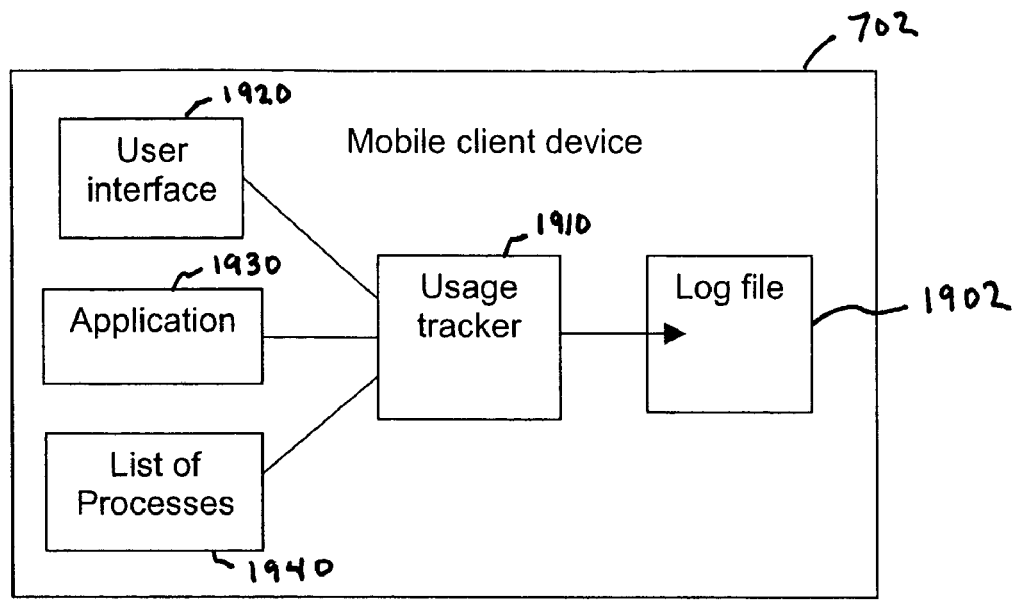

FIG. 19 shows a usage tracker in a mobile client device, according to embodiments of the present invention.

Figure 20:
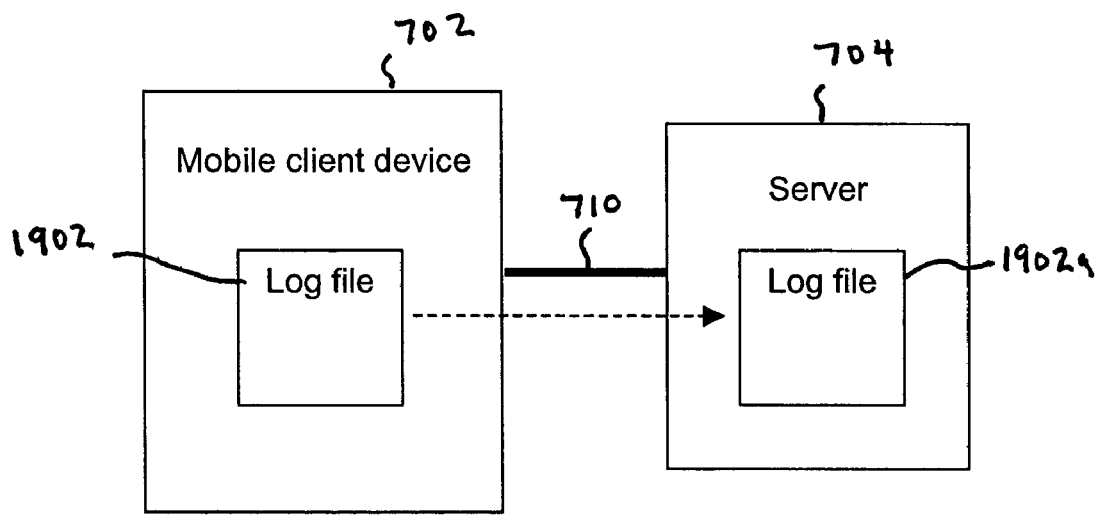

FIG. 20 shows an example log file transferred to a server from a mobile client device, according to an embodiment of the present invention.

FIG. 21 shows a flowchart providing example steps for tracking application usage on a mobile device, according to an example embodiment of the present invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF THE INVENTION

Introduction

The present invention enables mobile devices to more efficiently access data-driven applications and websites while operating in an offline mode. The present invention allows data-driven applications and websites to be interacted with, and viewed on mobile clients, while using less storage space, and requiring transfer of smaller amounts of data. Furthermore, the present invention allows for the customization of the display of data on mobile clients, on a client-by-client basis, or any other basis, as desired.

Data-driven applications and websites are applications and websites that allow the display of multiple pages of data, each page showing the data elements formatted in a similar manner from page to page. Example data-driven applications and/or websites include: directories, including phone directories and directories of other personal, corporate, or client information; email tools (such as AOL, HOTMAIL, YAHOO! EMAIL, and others); financial tools; investment tools (such as ETRADE, AMERITRADE, and others); database tools (such as MICROSOFT EXCEL); banking/checking tools (such as banking websites, QUICKEN, and others); etc. The present invention is directed towards these types of data-driven websites and applications, and to any other similar type websites or applications where many pages of commonly-formatted data are present.

Figure 1:
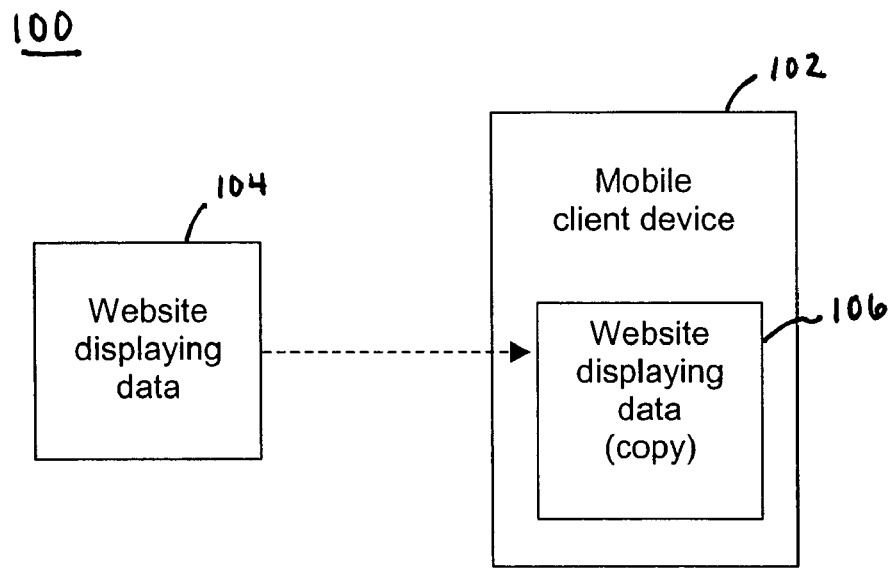
FIG. 1 shows a conventional system for accessing website data on a mobile client device

Conventionally, such applications and websites are made accessible on mobile devices by copying the entire application or website (i.e., all of the web pages of interest) to the mobile device. For example, FIG. 1 shows a conventional system 100 for displaying website data on a mobile client device 102. Mobile client device 102 desires to have access to a website 104 on device 102 when operating in an offline mode. Website 104 is a data-driven website. Mobile client device 102 desires to view data of website 104 in an offline mode. Thus, according to system 100, a copy of website 104 is transferred to mobile client device 102, shown as website copy 106. In other words, web pages of interest of website 104, including the data incorporated therein, are copied in their entirety to device 102. Mobile client device 102 can thereafter operate offline, and view the web pages of website copy 106, which incorporates data. However, system 100 is an inefficient way of accessing website 104 in an offline manner. A relatively large amount of storage is required on mobile client device 102 to store all of the downloaded web pages incorporating data. Furthermore, any updates to pages of website 104 can lead to having to entirely re-copy website 104 to mobile client device 102.

Figure 2:
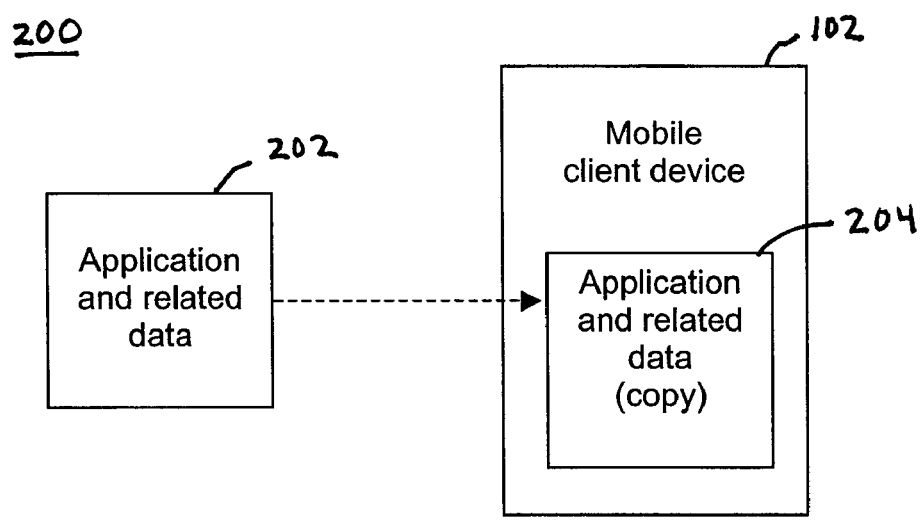
FIG. 2 shows a conventional system for accessing a data-driven application on a mobile client device.

FIG. 2 shows an example conventional system 200 for viewing a data-driven application on a mobile client device 102. In system 200, mobile client device 102 desires to have access to an application 202 on the mobile client device 102. Thus, a special mobile device version is created of application 202 and both the mobile version of the application and related data are transferred to mobile client device 202, as shown as application copy 204. Thereafter, mobile client device 102 can access application copy 204 and related data in an offline mode. However, system 200 is an inefficient way of accessing application 202 on mobile client device 102. A large amount of storage is required for mobile client device 102 to store application 202 and its related data. Furthermore, any updates to application 202 can lead to having to partially or entirely re-engineer and application 202 to mobile client device 102.

The present invention enables mobile devices to avoid the storage and transfer time problems that are present in conventional systems. Instead of copying entire applications and/or websites to client devices, the present invention copies web page templates and related application data to mobile devices. On the mobile device, the web page templates are filled in with the application data to create web pages that can be accessed/displayed on the mobile device. This is a more efficient way of viewing data-driven applications/websites on mobile devices relative to conventional systems.

Figure 3:
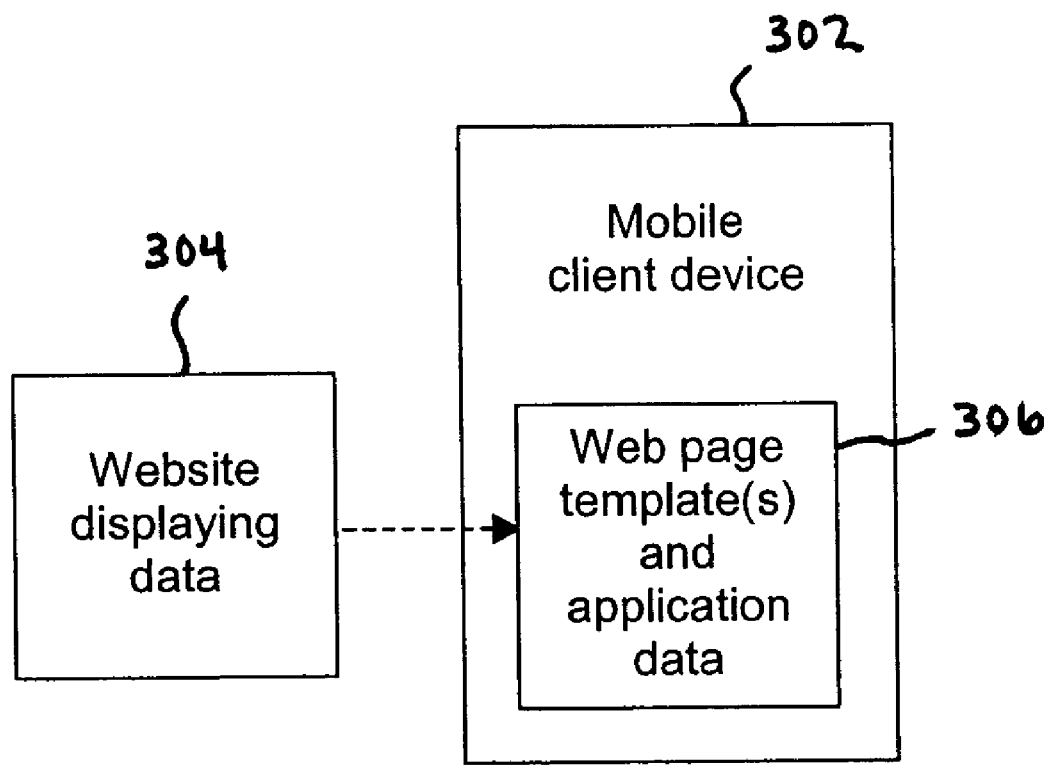
FIG. 3 shows a system for viewing a data-driven application or website on a mobile client device, according to an embodiment of the present invention.

For example, FIG. 3 shows a system 300 for viewing a data-driven application on a mobile client device 302, according to an embodiment of the present invention. A mobile client device 302 is shown in FIG. 3, on which it is desired to access data-driven applications and websites in an offline mode. According to the present invention, mobile client device 302 accesses a website 304 for copy to device 302.

However, instead of copying all of the desired web pages of website 304 (or copying an entire application) to mobile client device 302, web page templates and application data 306 are copied to mobile client device 302. A relatively smaller number of web page templates and related application data require less storage space than copying each desired web page of a website, such as website 104, individually. Alternatively, in an application environment, the web page templates and related application data will tend to require less space than that required to store an entire application, such as application 202.

Thus, for example, instead of copying one index web page and 100 data web pages to mobile client device 302, according to the present invention, a single index web page template and a single data web page template can be copied to device 302. The application data can be used to fill in the web page templates for display on mobile client device 302. Thus, savings in storage space on mobile client device 302 and in transfer times of objects to mobile client device 302 are realized.

Furthermore, when updates are made to the web page templates and/or application data, only the updated portion need be copied. For instance, if updates are made to a web page template, only the web page template need be recopied, without having to re-copy the application data. If changes are made to application data, the application data can be recopied, without having to copy the web page templates. Note that the application data can be organized in a single or multiple files. Thus, during an update, only the updated file(s) need be copied. Note that in some situations, it may be of value to re-copy the web pages templates and application data in their entirety.

Figure 4:
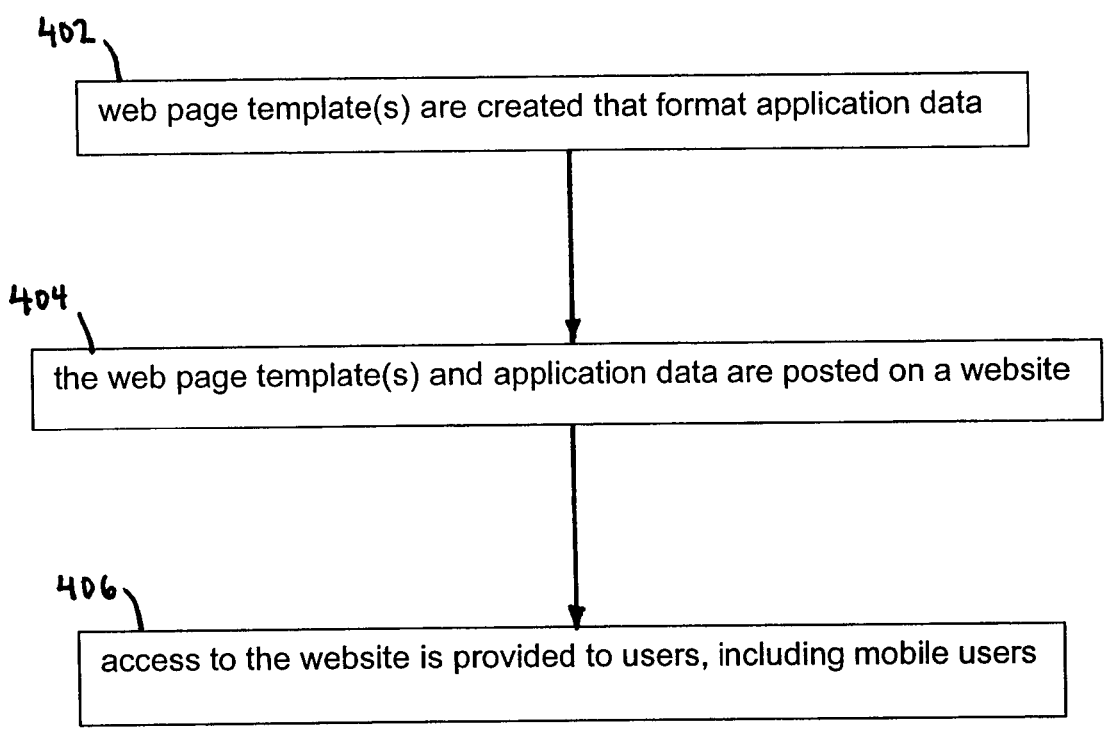
FIG. 4 shows a flowchart providing example steps for creating a website that may be copied and stored on a mobile device in an efficient manner, according to an example embodiment of the present invention.

FIG. 4 shows a flowchart 400 providing example steps for creating or modifying a website that may be copied and stored on a mobile device in an efficient manner, according to an example embodiment of the present invention. Other structural and operational embodiments will be apparent to persons skilled in the relevant art(s) based on the following discussion. These steps are described in detail below.

Figure 5A:
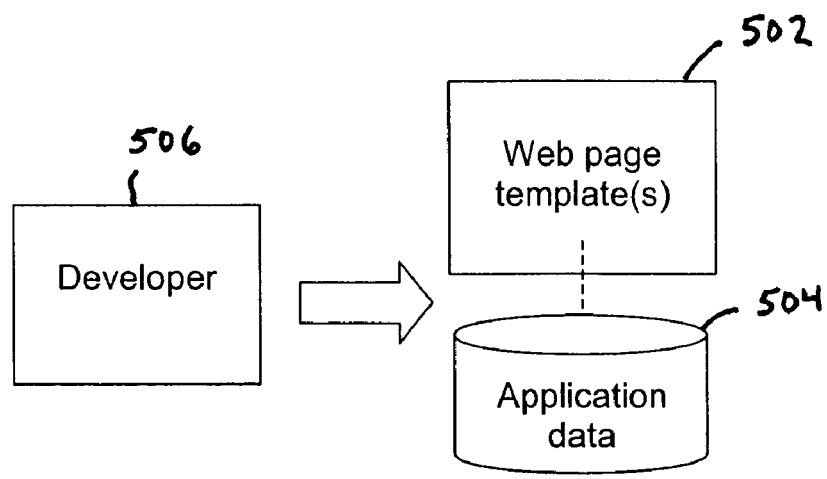
FIG. 5A shows a developer creating and posting web page templates and application data on a provider website, according to an example embodiment of the present invention.

Flowchart 400 begins with step 402. In step 402, web page template(s) are created that format application data. For example, a developer 506 creates web page template(s) 502, as shown in FIG. 5A, according to an example embodiment of the present invention. Developer 506 may be an individual or group of individuals, and/or an automated software generator tool. Developer 506 is typically employed or contracted by an application provider to maintain/generate the website. Web page template(s) 502 typically comprise a series of commands of HTML (HyperText Markup Language), XML (Extensible Markup Language), or other language understood by web browsers. As described in further detail below, the commands of web page template(s) format data of application 504 for viewing by the web browser, and may allow for interaction with the data through a user interface.

Figure 5B:
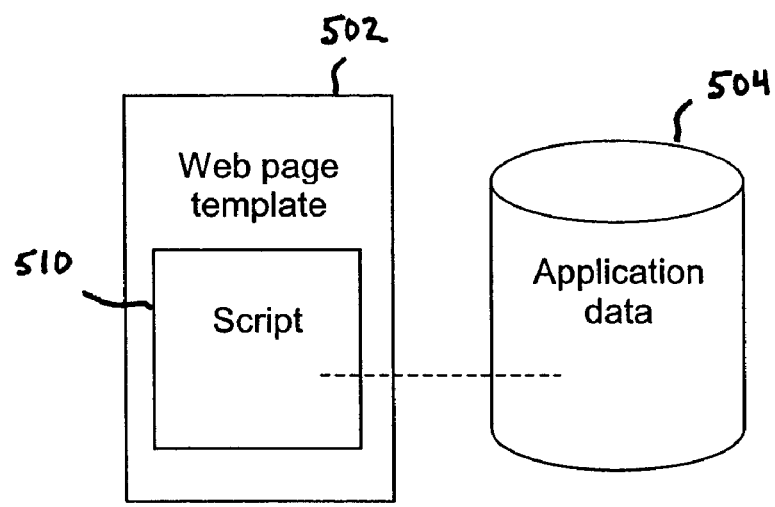
FIG. 5B shows a web page template that includes a script, according to an embodiment of the present invention.

For example, as shown in FIG. 5B, web page template(s) 502 may include reference to scripts which access application data 504, and format application data 504 into web page template(s) 502 to create web pages viewable on the mobile device. In an embodiment, the scripts can be JavaScript scripts which interact with the HTML, XML, or other source code to dynamically create web pages using web page template(s) 502 and application data 504.

FIGS. 6A-6C illustrate an example implementation of step 402, according to embodiment of the present invention. FIGS. 6A and 6B represent first and second web page templates 602 and 604 (the source code for web page templates 602 and 604 is not shown). FIG. 6 shows application data 606, according to example embodiments of the present invention. The example application of FIGS. 6A-6C is an employee directory for a company.

First web page template 602 of FIG. 6A represents an employee directory index. The employee index is capable of providing a list of employee names, with which a user may interact. Blank spaces 612a-d of first web page template 602 represent locations where employee names from application data 606 would be entered for display.

Second web page template 604 of FIG. 6B represents a detailed employee information page. Second web page template 604 is capable of showing a variety of data elements related to a particular employee selected by interacting with first web page template 602. For example, as shown for second web page template 604, the selected employee's name is shown, along with the employee's phone number, the employee's position/title within the company, and other data. Blank spaces are shown in row 620 of second web page template 604 where the various data elements related to the selected employee would be entered for display. In embodiments, the data shown in second web page template 604 can be interacted with.

FIG. 6C shows application data 606, which in the current example is various data elements related to the first and second web page templates 602 and 604. For example, a first column 632 of application data 606 shows employee names, which can be displayed formatted according to first web page template 602. For example, FIG. 6D shows an index web page 608 created from first web page template 602 with data of column 632 present therein. For instance, in an embodiment, when a user attempts to view web page 608, a script of first web page template 602 accesses application data 606 to bring the data of column 632 into first web page template 602 for display as web page 608.

A second column 634 of application data 606 shows employee phone numbers. A third column 636 shows employee positions. A fourth column 638, and further columns, can show any other data element type, as desired by the particular application. Data of application 606 relating to a particular employee can be displayed formatted according to second web page template 604. For example, when a particular employee is selected from web page 608, a corresponding employee data web page is created. For example, FIG. 6E shows a detailed employee information web page 610 created from second web page template 604 with data of columns 632, 634, 636, and 638 present in corresponding columns of row 620 therein. In the current example, a user selected employee Steve Jones in web page 608 for viewing. In an embodiment, a script of second web page template 602 accesses application data 606 to bring the data of columns 632, 634, 636, and 638 for Steve Jones into second web page template 604 for display as web page 610.

In step 404, the web page template(s) and application data are posted on a website. For example, in an embodiment, developer 506 posts web page template(s) 502 and application data 504 on an application provider's website, such as website 304.

In step 406, access to the website is provided to users, including mobile users. For example, the website is made available by an application provider to users as a group/company internal website, and/or is made externally available to users through the World Wide Web (i.e., Internet). Thereafter, as described herein, web page template(s) 502 and application data 504 can be copied from the application provider website to mobile devices. The application data may be viewed in web page format on the mobile devices when they are operating in an offline mode.

In an embodiment, flowchart 400 can also include a step of customizing the web page template(s) 502 and/or application data 504 for one or more users. For example, web page template(s) 502 can be customized so that they format application data for display in a first manner for a first set of users, and format application data for display in a second manner for a second set of users. Web page templates(s) 502 can be customized for any number of users. For instance, this may be accomplished by meta data or data tags to cause particular formatting to occur for one or more user names, authentication tokens, etc. Thus, embodiments of the present invention can flexibly display data for different users according to their particular needs. Furthermore, web page template(s) 502 can likewise be customized to provide different functionality/interactability for different users.

As described above, the invention is applicable to any application/website type, and in particular, to data-driven applications/websites. Any number of one or more web page templates can be used to format application data in any manner. The application data can include any number of type(s) of data, any quantities thereof, and can include the data formatted in any manner. For example, the application may be an email tool. Similar to the example described above with reference to FIGS. 6A-6E, the email tool may include an index web page template where a user can view subject lines, sender names, and/or other application data related to a list of emails. The email tool then may include a second web page template that shows detail about a particular email selected from the index web page, including an email subject line, the email text body, attachments, and/or any other relevant application data. The invention is applicable to any type of data driven application/web site type, as would be understood to persons skilled in the relevant art(s).

Example Environment of the Present Invention

Figure 7:
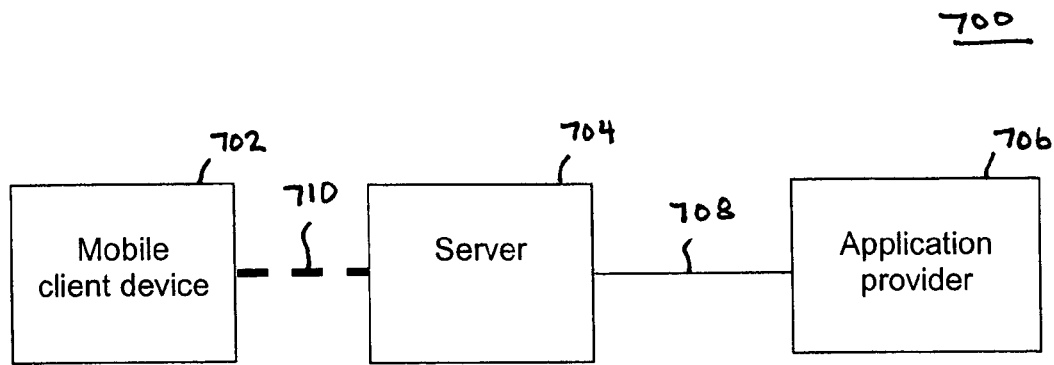

FIG. 7 is a block diagram of an example mobile computing environment 700 according to an embodiment of the invention. The mobile computing environment 700 includes a mobile client device 702, a server 704 (although only one server 704 is shown, in practice the mobile computing environment 700 may include a plurality of servers), and one or more application providers 706.

Generally, server 704 maintains a collection of channels. In an embodiment, a channel comprises a collection of objects. An object is any entity that can be transferred to a mobile client device 702, such as but not limited to a web pages, content, applications, application data, services, images, movies, music, links, etc. A channel can include a location of a root object, such as but not limited to a URL (uniform resource locator), and an indication of the number of levels below the root object, for which to include objects in the channel. For example, in an embodiment, if a channel number property is equal to "1 level," then all objects that are 1 level down from the root object (reached by traversing links in the root object), are included in the channel. If this property is equal to "2 levels," then all objects that are 1 level down from the root object (reached by traversing links in the root object), and all objects that are 1 level down from those objects (reached by traversing links in those objects), are included in the channel. Embodiments of the invention allow "uneven" trees, where some branches of the tree extent to a greater number of levels than other branches of the tree. In other embodiments, the trees are even or balanced.

Server 704 offers channels to mobile client device 702. Mobile client device 702 may access the server 704 and view the collection of channels. The mobile client device 702 may then select any combination of the channels in the collection. Server 704 maintains a list of the channels associated with mobile client device 702.

Mobile client device 702 and server 704 may be coupled together to perform a synchronization process. During a synchronization process, server 704 loads a device 702 with the channels associated with the mobile client device 702. Generally, server 704 does this by obtaining from providers 102 the objects defined by the channels, and causing those objects to be stored on the mobile client device 702. Thus, during the synchronization process, server 704 will load the mobile client device 702 with the selected channels. More particularly, server 704 will load the mobile client device 702 with the objects associated with the channels.

The mobile client device 702 may process and use those objects when not connected to the server 704 (i.e., in an "offline" mode). The invention enables the mobile client device 702 to actively interact with the objects and channels.

During synchronization with server 704, device 702 is coupled with server 704. In embodiments, mobile client device 702 directly communicates with server 704 via a communications medium 710 in a wired and/or wireless fashion using any protocol. For example, device 702 may "dock" directly with server 704 in a wired fashion. In another embodiment, mobile client device 702 indirectly interacts with server 704 via an adapter (not shown in FIG. 7). For example, mobile client device 702 may be a device, such as a Palm device, and the adapter may be a cradle and a computer coupled to the cradle (e.g., mobile client device 702 is inserted into the cradle). In such an embodiment, the adapter presents itself to server 704 as a mobile client device. When server 704 sends objects to the adapter, the adapter writes those objects to mobile client device 702. In embodiments, device 702 and/or an adapter (when present) can include a Hot Sync™ Manager (in a Palm operating environment, for example), an Active Sync™ (in the Windows CE™ operating environment, for example), or Pilot Link™ (in the Unix operating environment, for example) etc. It is noted that the invention is not limited to any of the implementation examples discussed herein, and that these implementation examples are provided for illustrative purposes only.

Device 702 may be any type of data processing device. In embodiments of the invention, device 702 is a mobile computing device, although the invention is not limited to these embodiments. In such example embodiments, the device 702 may be, but is not limited to, handheld computers, cellular phones, internet-enabled phones, pagers, radios, televisions, audio devices, car audio systems, recorders, text-to-speech devices, bar-code scanners, net appliances, mini-browsers, personal data assistants (PDAs), etc.

In embodiments of the invention, device 702 includes software, hardware, firmware, and/or any combinations thereof to provide its functions. In an embodiment, mobile client device 702 includes a user interface (UI), a web browser, and a JavaScript engine. Other embodiments of mobile client device 702 may include alternative and/or additional modules.

The user interface of device 702 preferably includes a graphical user interface that enables users to interact with mobile client device 702 and functions and modules provided by mobile client device 702. For example, the user interface can display web pages that have been downloaded to device 702, and can allow users to interact with the web pages. The JavaScript engine of device 702 executes objects written in the JavaScript language that operate on mobile client device 702.

Providers 706 are sources of various types of objects, such as but not limited to content (content providers), applications (application providers), services (service providers), etc. Providers 706 may also include servers (similar to server 704), which may provide objects such as but not limited to content, applications, services, etc. For example, and without limitation, the application providers 706 may provide objects relating to (without limitation) operating system updates/changes, system upgrades, application updates/changes, etc.

Server 704 and application 706 are coupled together through a communication path 708. Communication path 708 can be any type of communication link, or combination of links, wired or wireless. Server 704 and application provider 706 can be located within the same computer system, or in different computer systems.

Figure 8:
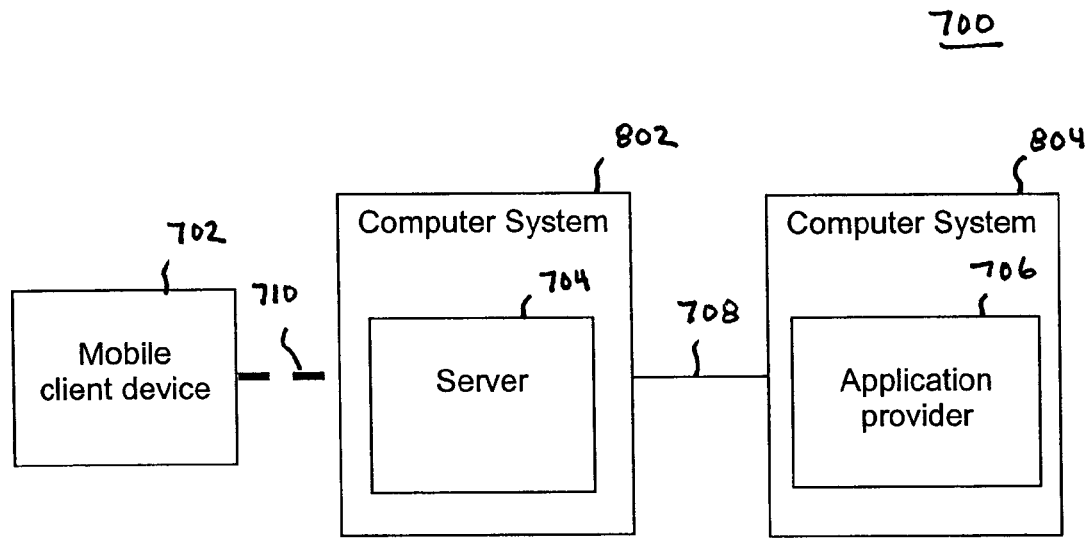
Figure 9:
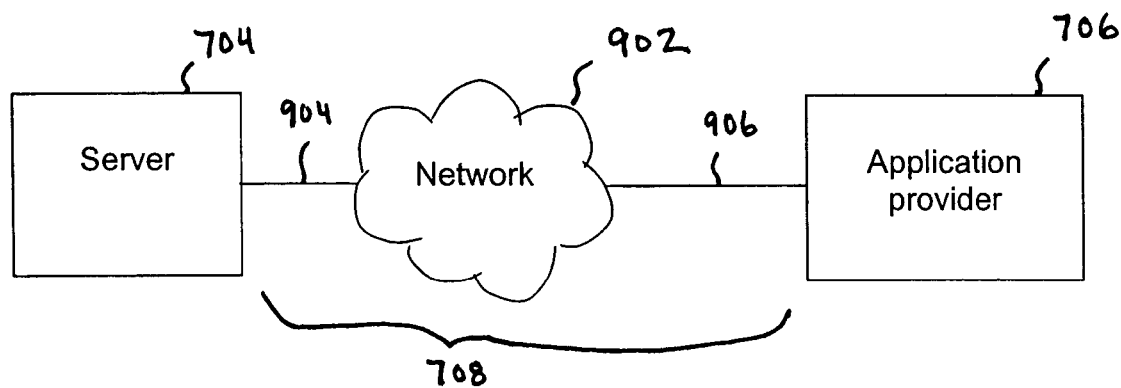

For example, FIG. 8 shows server 704 residing in a first computer system 802, and shows application provider 706 residing in a second computer system 804. First and second computer systems 802 and 804 can be workstations, personal computers, or any other computer system type. In such an arrangement, server 704 and application 706 typically communicate through a network connection (wired, wireless, or combination). For example, FIG. 9 shows server 704 and application provider 706 coupled together through communication path 708, which includes a first link 904, a network 902, and a second link 906. Network 902 can be any type of network, or combinations of networks, including a local area network (LAN) and/or wide area network (WAN), including an intranet and/or the Internet. Server 704 can include any combination of hardware, software, and/or firmware present in computer system 802. Application provider 706 can include any combination of hardware, software, and/or firmware present in computer system 804.

Figure 10:
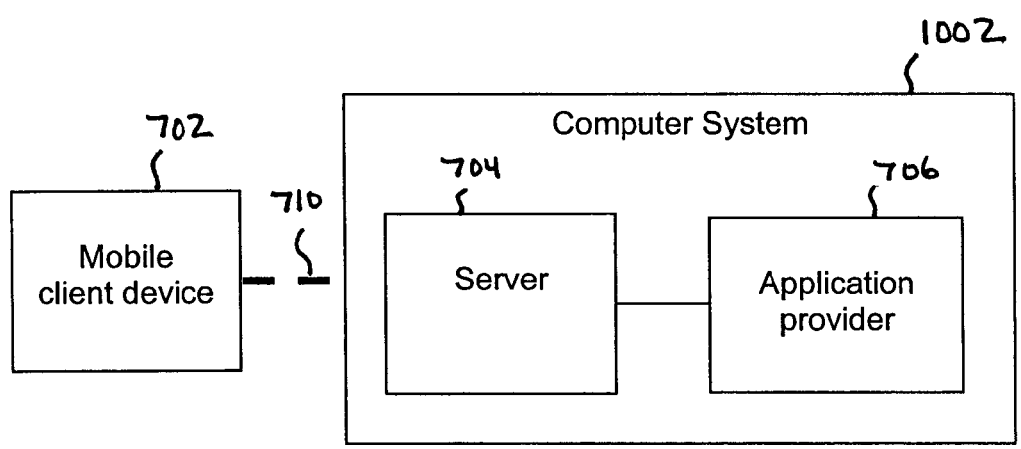

Alternatively, as shown in FIG. 10, server 704 and application provider 706 can both be present in a single computer system 1002.

Example Operational Embodiments of the Present Invention

Operational embodiments of the present invention are provided in this section for enabling the access of data-driven websites/applications on mobile devices. These operational embodiments are provided for illustrative purposes, and are not limiting. Additional operational and structural embodiments for the present invention will be apparent to persons skilled in the relevant art(s) from the description herein. These additional embodiments are within the scope and spirit of the present invention.

Figure 12:
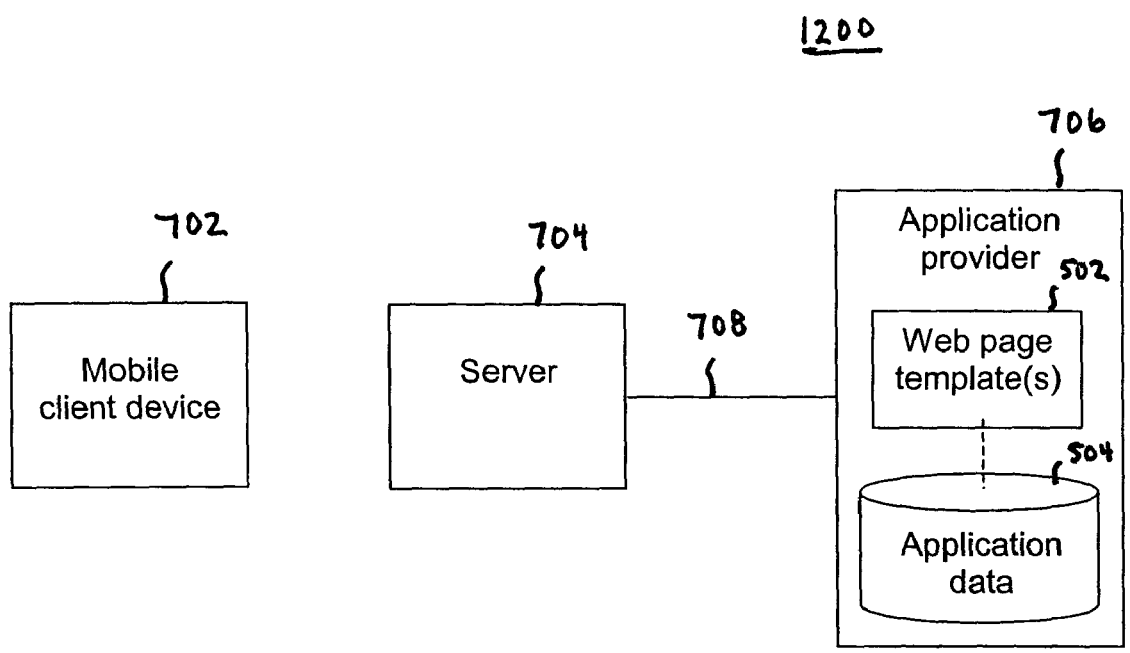

FIG. 12 shows an example system 1200, according to an example embodiment of the present invention. System 1200 is used to demonstrate example operations of the present invention. As shown in FIG. 12, system 1200 is similar to system 700 shown in FIG. 7. System 1200 includes mobile client device 702, server 704, and application provider 706. Server 704 and application 706 are coupled by communication path 708. As shown in FIG. 12, application provider 706 includes one or more web page template(s) 502 and application data 504. Web page template(s) 502 and application data 504 are present on a website of application provider 706, which is accessible to server 104 via communication path 708.

FIG. 11A shows a flowchart 1100 providing example steps for managing the copy of a data-driven website from a provider, such as application provider 706, to a mobile device, such as mobile client device 702, according to an example embodiment of the present invention. For example, the steps of flowchart 1100 may be performed by a server, such as server 704 shown in FIG. 12, and/or one or more other intermediary devices between application provider 706 and mobile client device 702. In an embodiment, the steps shown in FIG. 11A may occur during a synchronization process between mobile client device 702 and server 704, although these steps do not have to occur during synchronization. FIGS. 11B and 11C show additional steps that may be performed for flowchart 1100, according to embodiments of the present invention. Other structural and operational embodiments will be apparent to persons skilled in the relevant art(s) based on the following discussion. These steps are described in detail below.

Figure 13:
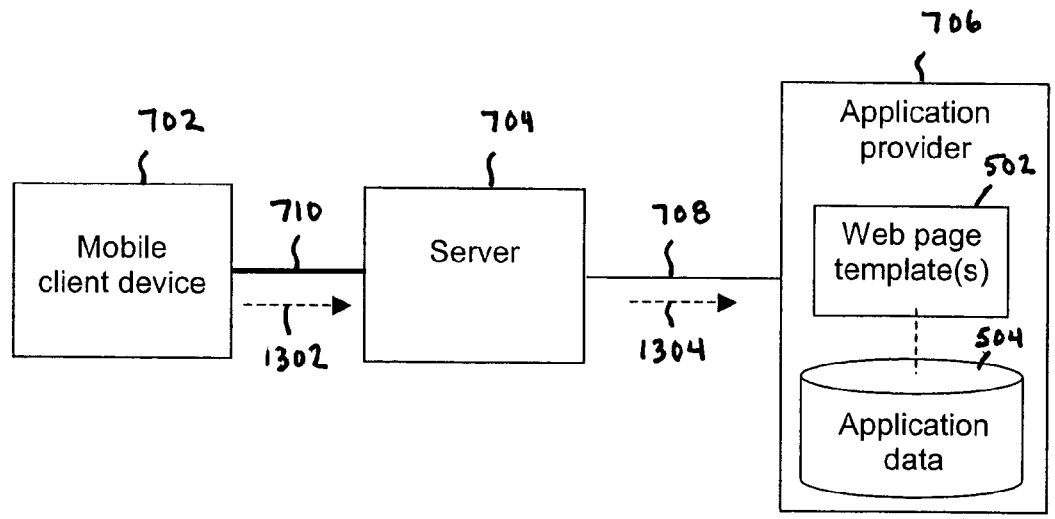

Flowchart 1100 begins with step 1102. In step 1102, a request for a website received from the mobile client device is transmitted to a provider. For example, FIG. 13 shows system 1200, where mobile client device 702 has coupled with server 704 via communication medium 710. As represented by arrows 1302 and 1304, server 704 receives a request for a website from mobile client device 702 and transmits the request to application provider 706, which includes the requested website.

Figure 14:
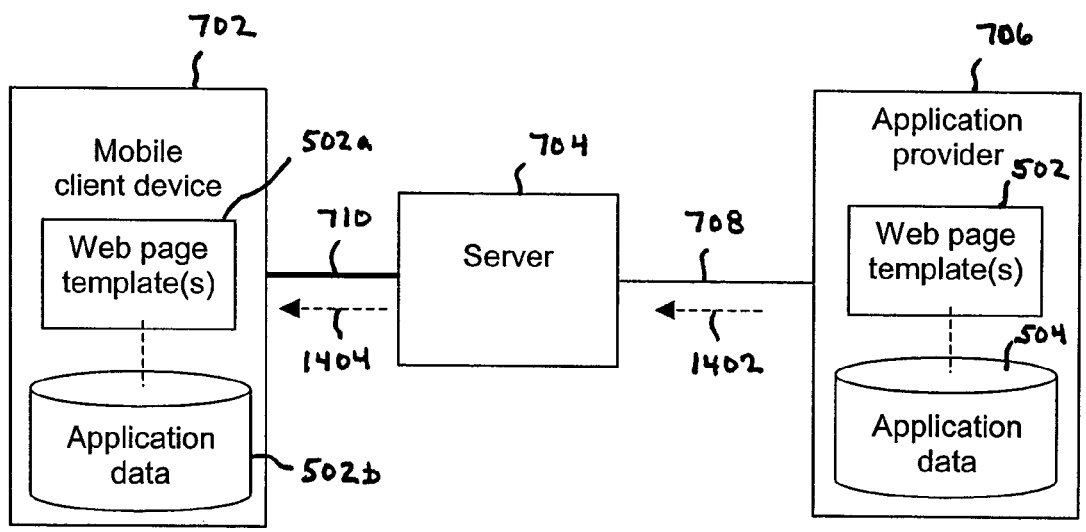

In step 1104, at least one web page template of the website and application data corresponding to the at least one web page template are received from the provider in response to the request. For example, FIG. 14 shows system 1200, where server 704 receives web page template(s) 502 and application data 504 from application provider 706 in response to the request, as represented by arrow 1402.

In step 1106, the at least one web page template and the application data are transmitted to the mobile client device. For example, FIG. 14 shows server 704 transmit web page template(s) 502 and application data 504 to mobile client device 702, as represented by arrow 1404. The copies of web page template(s) 502 and application data 504 stored in mobile client device 702 are shown in FIG. 14 as web page template(s) 502a and application data 504a.

Thus, in an offline mode, where mobile client device 702 is not coupled to server 704, mobile client device 702 can display a plurality of web pages corresponding to the website of application provider 706. Each web page displays corresponding data of application data 504a, formatted according to a common format(s) provided by web page template(s) 502a.

Figure 15:
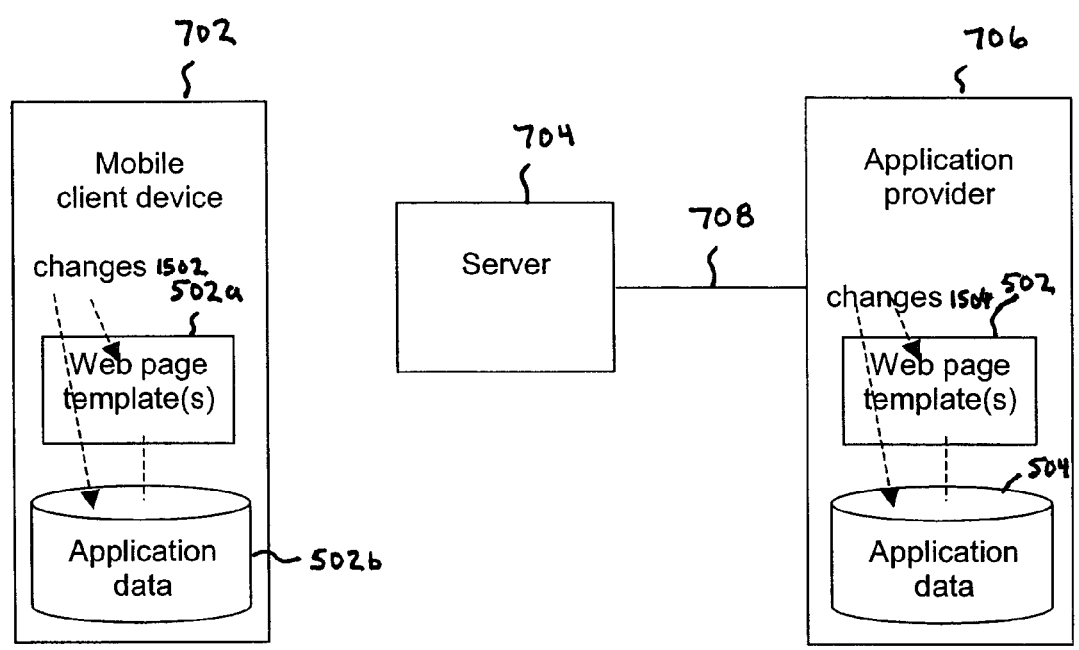

Furthermore, changes to web page template(s) 502 and/or application data 504 can occur on either or both of mobile client device 702 and application provider 706. This is represented in FIG. 15, which shows changes 1502 made at mobile client device 702 and changes 1504 made a application provider 706. For example, on mobile client device 702 and/or application provider 706, a developer or user can change web page template(s) 502 and/or application data 504. One or more web page templates of web page template(s) 502 can be changed by modifying, deleting, and adding them, to change formatting of displayed data, and/or to modify, add, or subtract logic, functionality, and/or interactability to the resulting web pages. For example, scripts of web page template(s) 502 can be changed, by modifying one or more existing templates, deleting one or more templates, and adding one or more templates to change formatting of displayed data. Furthermore, scripts of web page template(s) 502 can be changed to modify, add, or subtract logic, functionality, and interactability to the resulting web pages. Alternatively or additionally, data of application data 504 may be changed by modifying one or more data elements, adding data, and deleting data.

Note that in another embodiment, changes to web page template(s) 502 and/or application data 504 can occur at server 704, as will be apparent to persons skilled in the relevant art(s) from the teachings herein.

FIG. 11B shows example additional steps for flowchart 1100, according to an embodiment of the present invention where changes have been made at application provider 704. In an embodiment, the steps shown in FIG. 11B may occur during a second or subsequent synchronization process between mobile client device 702 and server 704, although these steps do not have to occur during synchronization.

In step 1108, a second request for the website received from the mobile client device is transmitted to the provider. For example, a second request for the website by mobile client device 702 is transmitted to application provider 706 by server 704 in a similar fashion as shown in FIG. 13 for the first request.

Figure 17:
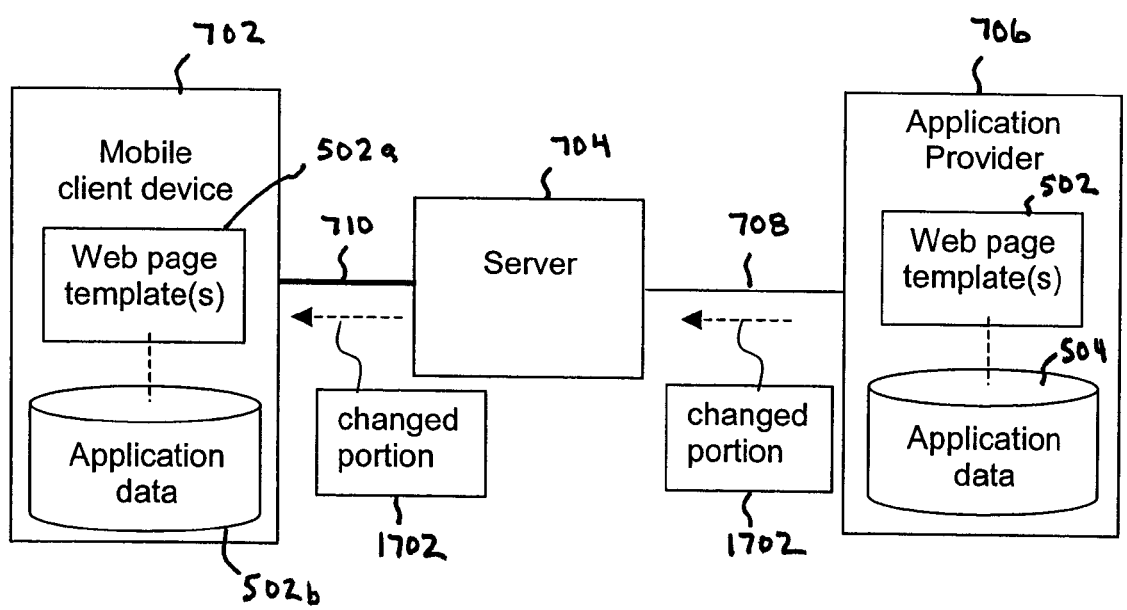

In step 1110, a changed portion of the at least one web page template and application data is received from the provider in response to the second request. For example, as shown in FIG. 17, a changed portion 1702 is received from application provider 706 by server 704 in response to the second request. Changed portion 1702 can include changes to web page template(s) 502 and/or application data 504 as described above. Changed portion 1702 may include entire web page templates that have been changed, or the changed portions thereof. Furthermore, changed portion 1702 may include one or more changed data elements of application data 504, or all of application data 504, with changes therein.

In step 1112, the changed portion of the at least one web page template and application data is transmitted to the mobile client device. For example, as shown in FIG. 17, changed portion 1702 is transmitted from server 704 to mobile client device 702.

Thus, thereafter, mobile client device 702 can access the website in an offline mode, incorporating the changes transferred thereto as changed portion 1702.

FIG. 11C shows example additional steps for flowchart 1100, according to another embodiment of the present invention where changes have been made at mobile client device 702. In an embodiment, the steps shown in FIG. 11C may occur during a second or subsequent synchronization process between mobile client device 702 and server 704, although these steps do not have to occur during synchronization.

Figure 16:
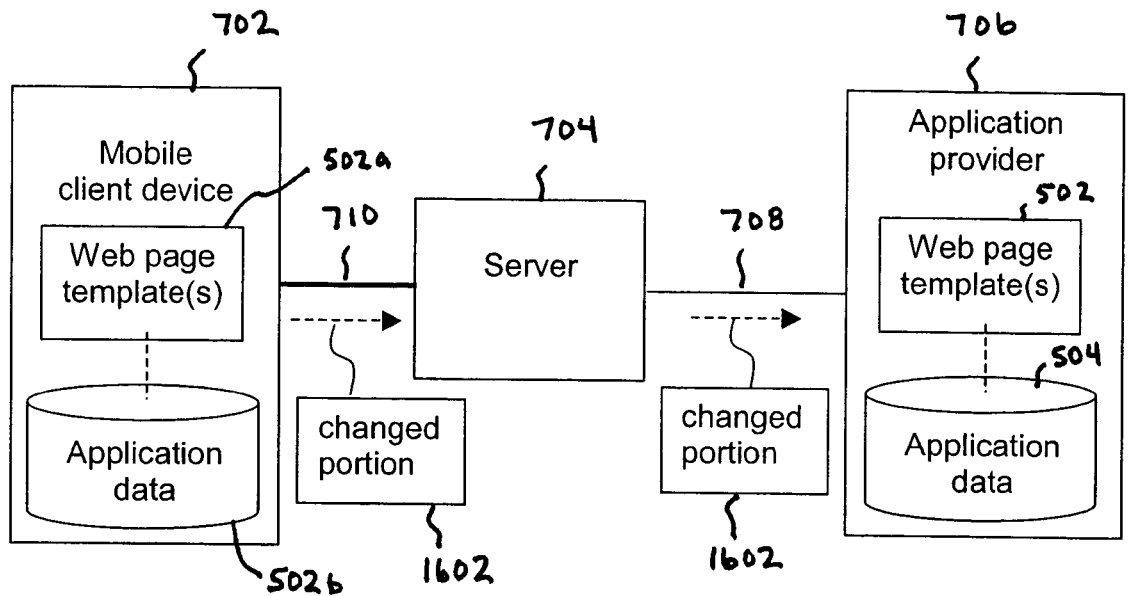

In step 1114, a changed portion of the at least one website template and application data is received from the mobile client device. For example, as shown in FIG. 16, a changed portion 1602 is received from mobile client device 702 at server 704. Changed portion 1602 can include changes to web page template(s) 502a and/or application data 504a as described above. Changed portion 1602 may include entire web page templates that have been changed, or the changed portions thereof. Furthermore, changed portion 1602 may include one or more changed data elements of application data 504a, or all of application data 504a, with changes therein.

In step 1116, the changed portion is transmitted to the provider. For example, as shown in FIG. 16, changed portion 1602 is transmitted to application provider 706 by server 704.

Thus, thereafter, future copies by mobile client device 702, or by other mobile devices, of web page template(s) 502 and application data 504 will incorporate the changes transferred thereto as changed portion 1602.

Note that the presence of changes to web page template(s) 502 and/or application data 504 can be determined before performing any transfers. For example direct comparisons, hashing processes, checksums, time stamps, version numbers, and/or any other way of comparing web page templates(s) 502 and/or application data 504 stored on application provider 706 to web page template(s) 502a and/or application data 504a stored on mobile client device 702 can be performed.

FIGS. 18A-18C relate to embodiments of the present invention from a server perspective. FIGS. 18A-18C related to embodiments of the present invention from the perspective of a mobile device. FIG. 18A shows a flowchart 1800 providing example steps for receiving and managing a copy of a data-driven website at a mobile device, according to an example embodiment of the present invention. The steps of flowchart 1800 may be performed by a mobile device, such as mobile client device 702. FIGS. 18B and 18C show additional steps that may be performed for flowchart 1800, according to embodiments of the present invention. Other structural and operational embodiments will be apparent to persons skilled in the relevant art(s) based on the following discussion. These steps are described in detail below.

Flowchart 1800 begins with step 1802. In step 1802, a request for a website is transmitted from the mobile client device to the server. For example, as shown in FIG. 13, a request for a website is transmitted from mobile client device 702 to server 704, as represented by arrow 1302.

In step 1804, at least one web page template and application data corresponding to the website are received from the server at the mobile client device in response to the request. For example, as shown in FIG. 14, web page template(s) 502a and application data 504a are received from server 704 at mobile client device 702 in response to the request, as represented by arrow 1404.

Note that in an embodiment, steps 1802 and 1804 may occur during a synchronization process between mobile client device 702 and server 704, although they do not necessarily have to occur during a synchronization.

In step 1806, a selected web page of the website is displayed on the mobile client device in an offline mode by displaying data of the application data corresponding to the selected web page formatted according to the at least one web page template. For example, a web page may be displayed by a graphical user interface (GUI) of mobile client device 702 in an offline mode when selected by a user. The selected web page displays data of application data 504a. The data is formatted according to a template of web page template(s) 502a.

FIG. 18B shows example additional steps for flowchart 1800, according to an embodiment of the present invention.

In step 1808, a second request for the website is transmitted from the mobile client device to the server. For example, a second request for the website by mobile client device 702 is transmitted to server 104 in a similar fashion as shown in FIG. 13 for the first request.

In step 1810, a changed portion of the at least one web page template and application data is received from the server at the mobile client device in response to the second request. For example, as shown in FIG. 17, a changed portion 1702 is received from server 704 at mobile client device 702 in response to the second request.

Note that in an embodiment, steps 1808 and 1810 may occur during a second or subsequent synchronization process between mobile client device 702 and server 704, although they do not necessarily have to occur during a synchronization.

In step 1812, a selected web page of the website is displayed on the mobile client device in an offline mode. For example, the web page may be displayed by a graphical user interface (GUI) of mobile client device 702 in an offline mode when selected by a user. The selected web page displays data of application data 504a. The data is formatted according to a template of web page template(s) 502a. The data may have been changed, and/or the web page template may have been changed, as received in changed portion 1702.

FIG. 18C shows example additional steps for flowchart 1800, according to another embodiment of the present invention.

In step 1814, a change to the application data is input by a user at the mobile client device. For example, in an embodiment, a user of mobile client device 702 can input one or more changes to application data 504a into mobile client device 702. The changes can alternatively or additionally include changes to web page template(s) 502a.

In step 1816, the change to the application data is transmitted from the mobile client device to the server. For example, as shown in FIG. 16, a changed portion 1602 is received from mobile client device 702 at server 704. Server 704 can then transfer the changes to application provider 706. Thus, thereafter, future copies by mobile client device 702, or by other mobile devices, of web page template(s) 502 and application data 504 will incorporate the changes transferred thereto as changed portion 1602.

Note that in an embodiment, step 1816 may occur during a second or subsequent synchronization process between mobile client device 702 and server 704, although it does not necessarily have to occur during a synchronization.

Tracking of Application Usage on Mobile Devices

According to embodiments of the present invention, the usage of applications on a mobile device is tracked. The tracking of the usage of applications on a mobile device can be useful. For example, it may be desired to track the usage of applications on mobile devices to justify the cost of purchasing the applications that run on mobile devices, as compared to purchasing the applications for use on non-mobile devices, such as desktop computers, etc. A company/organization may want to know whether their personnel are using the applications running on mobile devices, to aid in understanding the value of mobile capability to the company/organization. For example a sales company may desire to know whether their salespeople are using their mobile devices, and in particular, whether their salespeople are accessing the sales related applications on the mobile devices.

The usage of any application capable of operating on a mobile device can be tracked. For example, word processing applications, database applications, web browser applications, record-keeping applications, email applications, proprietary applications, and any other type of application may be tracked.

Furthermore, any type of usage data can be tracked. For example, a number of times an application is executed or accessed can be tracked. Furthermore, more detailed usage information regarding a particular application can be tracked. For example, a number of documents, emails, and databases accessed can be tracked. A number of web pages accessed can be tracked, including a number of times a particular web page is accessed. A number of times a synchronization process occurs between a server and the mobile device can be tracked.

For example, FIG. 19 shows a usage tracker 1910 in mobile client device 702, according to an embodiment of the present invention. In an embodiment, usage tracker 1910 is a software module operating in mobile client device 702. In embodiments, usage tracker 1910 can be implemented in hardware, software, and/or firmware, in any combination.

Usage tracker 1910 can be configured in a variety of ways to track usage of applications. As shown in FIG. 19, for example, in an embodiment, usage tracker 1910 can be coupled to a user interface 1920 of the mobile client device 702 to be alerted when applications are executed by a user through user interface 1920.

In another embodiment, as shown in FIG. 19, applications themselves, such as application 1930 residing in mobile client device 702, can contain or be supplied with code that notifies usage tracker 1910 when the application is being executed. In embodiments, the application code provides more detailed information regarding application usage, such as is described above.

In another embodiment, as shown in FIG. 19, usage tracker 1910 can periodically poll a list of processes 1940 of mobile client device 702 that lists processes currently operating on mobile client device 702. Such an arrangement is useful to obtain length-of-time usage information for applications. Other ways of tracking applications that are otherwise known are also applicable to the present invention. Usage tracker 1910 stores application usage information in any manner. For example, as shown in FIG. 19, usage tracker 1910 may write application usage information into a log file 1902, as shown in FIG. 19.

Subsequently, the usage information stored in mobile client device 702 can be transferred from mobile client device 702 for use elsewhere. For example, as shown in FIG. 20, during a synchronization process between mobile client device 702 and server 704, log file 1902 is transferred to server 704. The copy of log file 1902 is shown stored on server 704 as log file 1902a. Alternatively, the usage information may be transferred at times other than during a synchronization process.

FIG. 21 shows a flowchart 2100 providing example steps for tracking application usage on a mobile device, according to an example embodiment of the present invention. Other structural and operational embodiments will be apparent to persons skilled in the relevant art(s) based on the following discussion. These steps are described in detail below.

Flowchart 2100 begins with step 2102. In step 2102, occurrence of at least one user initiated event on the mobile client device while the client device is operating offline is enabled. For example, as described above, the user initiated event(s) may include one or more executions or accesses of one or more particular applications. Furthermore, as described above, the user initiated event(s) may include one or more usage events within one or more applications.

In step 2104, usage data corresponding to the occurrence of at least one user initiated event on the mobile client device is stored. For example, as shown in FIG. 19 usage data may be stored in log file 1902, or in other device storage or memory.

In step 2106, the mobile client device is synchronized with a server, including the step of transmitting the usage data to the server. For example, as shown in FIG. 20, a copy of log file 1902 is transferred to server 704.

In step 2108, at least one report is created from the usage data. In embodiments, the usage information stored in log file 1902 may be processed and/or formatted in any way to create one or more useful reports. As described above, the reports may be used to determine the usefulness of having applications available on mobile devices versus on non-mobile devices, or may be used for other reasons.

In step 2110, the at least one report is displayed. For example, in an embodiment, the at least one report is displayed on a graphical user interface at server 704, or at another computer system coupled to server 704.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for enabling access to data driven websites on a mobile client device, wherein a data driven website includes a plurality of web pages that display data according to a common format, the method comprising:
    synchronizing the mobile client device with a server, comprising:
        transmitting a request for a website from the mobile client device to the server; and
        receiving from the server at the mobile client device at least one web page template and application data corresponding to the website in response to the request;
    displaying a selected web page of the website on the mobile client device in an offline mode, comprising displaying data of the application data that corresponds to the selected web page formatted according to the at least one web page template; and
    synchronizing the mobile client device with the server a second time, comprising:
        transmitting a second request for the website from the mobile client device to the server; and
        receiving from the server at the mobile client device a changed portion of the at least one web page template and application data in response to the second request.

2. The method of claim 1, wherein the changed portion includes a changed version of the application data, the method further comprising displaying a second selected web page of the website on the mobile client device in an offline mode, comprising displaying data of the changed version of the application data that corresponds to the second selected web page formatted according to the at least one web page template.

3. The method of claim 1, wherein the application data comprises a plurality of data elements, wherein the changed portion comprises a changed data element, the method further comprising displaying a second selected web page of the website on the mobile client device in an offline mode, comprising displaying the changed data element corresponding to the second selected web page formatted according to the at least one web page template.

4. The method of claim 1, wherein the changed portion includes a changed web page template, the method further comprising:
    displaying a second selected web page of the website on the mobile client device in an offline mode, comprising displaying data of the application data that corresponds to the second selected web page formatted according to the changed web page template.

5. The method of claim 1, wherein the changed portion comprises a changed web page template and a changed executable script called by a web page template, the method further comprising displaying a second selected web page of the website on the mobile client device in an offline mode, comprising:
    displaying data of the application data that corresponds to the second selected web page formatted according to the changed web page template; and
    executing the changed executable script called by the changed web page template to format the data for display on the mobile client device.

6. A method in a server for interfacing one or more providers with a mobile client device, the method comprising:
    synchronizing the mobile client device with the server, comprising:
        transmitting a request for a website received from the mobile client device to a provider;
        receiving from the provider at least one web page template of the website and application data corresponding to the at least one web page template in response to the request;
        transmitting the at least one web page template and the application data to the mobile client device, wherein, in an offline mode, the mobile client device can display a plurality of web pages corresponding to the website, each web page displaying data of the application data formatted according to a common format provided by the at least one web page template;
    synchronizing the mobile client device with the server a second time, comprising:
        transmitting a second request for the website received from the mobile client device to the provider;
        receiving from the provider a changed portion of the at least one web page template and application data in response to the second request; and
        transmitting the changed portion of the at least one web page template and application data to the mobile client device, wherein the mobile client device can use the changed portion to update the at least one web page template and application data stored therein.

7. The method of claim 6, wherein the changed portion comprises a change to the application data, wherein transmitting the changed portion of the at least one web page template and application data comprises transmitting the application data, including the change to the application data, to the mobile client device.

8. The method of claim 6, wherein the application data comprises a plurality of data elements, wherein the changed portion comprises a changed data element, wherein transmitting the changed portion of the at least one web page template and application data comprises transmitting the changed data element to the mobile client device.

9. The method of claim 6, wherein the changed portion comprises a changed web page template, wherein transmitting the changed portion of the at least one web page template and application data comprises transmitting the changed web page template to the mobile client device.

10. The method of claim 6, wherein the changed portion comprises a changed executable script called by a web page template, wherein transmitting the changed portion of the at least one web page template and application data comprises transmitting the changed executable script to the mobile client device.

11. A method for enabling access to data driven websites on a mobile client device, wherein a data driven website includes a plurality of web pages that display data according to a common format, the method comprising:
    synchronizing the mobile client device with a server, comprising:

transmitting a request for a website from the mobile client device to the server; and receiving from the server at the mobile client device at least one web page template and application data corresponding to the website in response to the request;

displaying a selected web page of the website on the mobile client device in an offline mode, comprising displaying data of the application data that corresponds to the selected web page formatted according to the at least one web page template; and synchronizing the mobile client device with the server a second time, comprising:

transmitting a second request for the website from the mobile client device to the server; and receiving from the server at the mobile client device any changed portion of the at least one web page template and any changed portion of the application data in response to the second request.

12. A method in a server for interfacing one or more providers with a mobile client device, the method comprising:

synchronizing the mobile client device with the server, comprising:

transmitting a request for a website received from the mobile client device to a provider;

receiving from the provider at least one web page template of the website and application data corresponding to the at least one web page template in response to the request; and transmitting the at least one web page template and the application data to the mobile client device, wherein, in an offline mode, the mobile client device can display a plurality of web pages corresponding to the website, each web page displaying data of the application data formatted according to a common format provided by the at least one web page template; and synchronizing the mobile client device with the server a second time, comprising:

transmitting a second request for the website received from the mobile client device to the provider;

receiving from the provider any changed portion of the at least one web page template and any changed portion of the application data in response to the second request; and transmitting the any changed portion of the at least one web page template and the any changed portion of the application data to the mobile client device, herein the mobile client device can use the any changed portion of the at least one web page template and the any changed portion of the application data to update the at least one web page template and the application data stored therein.

13. A computer program product comprising a non-transitory computer readable storage medium having computer program logic stored thereon that, in response to execution by a processor, causes the processor to access data driven websites on a mobile client device by performing operations, wherein a data driven website includes a plurality of web pages that display data according to a common format, the operations comprising:

synchronizing the mobile client device with a server, the synchronizing comprising:

transmitting a request for a website from the mobile client device to the server; and receiving from the server at the mobile client device at least one web page template and application data corresponding to the website in response to the request;

displaying a selected web page of the website on the mobile client device in an offline mode, the displaying comprising displaying data of the application data that corresponds to the selected web page formatted according to the at least one web page template; and synchronizing the mobile client device with the server a second time, the second synchronizing comprising:

transmitting a second request for the website from the mobile client device to the server; and receiving from the server at the mobile client device a changed portion of the at least one web page template and application data in response to the second request.

14. A computer program product comprising a non-transitory computer readable storage medium having computer program logic stored thereon that, in response to execution by a processor causes the processor to interface one or more providers with a mobile client device by performing operations for synchronizing the mobile client device with a server controlling at least one processor in the server, the operations comprising:

transmitting a request for a website received from the mobile client device to a provider;

receiving from the provider at least one web page template of the website and application data corresponding to the at least one web page template in response to the request, and transmit the at least one web page template and the application data to the mobile client device, wherein, in an offline mode, the mobile client device can display a plurality of web pages corresponding to the website, each web page displaying data of the application data formatted according to a common format provided by the at least one web page template; and synchronizing the mobile client device with the server a second time, the second synchronizing comprising:

transmitting a second request for the website received from the mobile client device to the provider;

receiving from the provider a changed portion of the at least one web page template and application data in response to the second request; and transmitting the changed portion of the at least one web page template and application data to the mobile client device;

wherein the mobile client device can use the changed portion to update the at least one web page template and application data stored therein.

15. A computer program product comprising a non-transitory computer readable storage medium having instructions stored thereon, that when executed by a processor, cause the processor to access data driven websites on a mobile client device, wherein a data driven website includes a plurality of web pages that display data according to a common format, the instructions comprising:

instructions for synchronizing the mobile client device with a server, the synchronizing comprising:

instructions for transmitting a request for a website from the mobile client device to the server; and instructions for receiving from the server at the mobile client device at least one web page template and application data corresponding to the website in response to the request;

instructions for displaying a selected web page of the website on the mobile client device in an offline mode, the instructions for displaying comprising:
   instructions for displaying data of the application data that corresponds to the selected web page formatted according to the at least one web page template; and
instructions for synchronizing the mobile client device with the server a second time, the second synchronizing comprising:
   instructions for transmitting a second request for the website from the mobile client device to the server; and
   instructions for receiving from the server at the mobile client device any changed portion of the at least one web page template and any changed portion of the application data in response to the second request.

16. An apparatus including a non-transitory computer readable medium having computer program logic stored thereon, that if executed by a processor, cause the processor to perform operations for interfacing one or more providers with a mobile client device, the operations comprising:
   synchronizing the mobile client device with the server a second time, the synchronizing comprising:
      transmitting a request for a website received from the mobile client device to a provider;
      receiving from the provider at least one web page template of the website and application data corresponding to the at least one web page template in response to the request; and
      transmitting the at least one web page template and the application data to the mobile client device, wherein, in an offline mode, the mobile client device can display a plurality of web pages corresponding to the website, each web page displaying data of the application data formatted according to a common format provided by the at least one web page template; and
   synchronizing the mobile client device with the server a second time, the second synchronizing comprising:
      transmitting a second request for the website received from the mobile client device to the provider;
      receiving from the provider any changed portion of the at least one web page template and any changed portion of the application data in response to the second request; and
      transmitting the any changed portion of the at least one web page template and the any changed portion of the application data to the mobile client device;
      wherein the mobile client device can use the any changed portion of the at least one web page template and the any changed portion of the application data to update the at least one web page template and the application data stored therein.

17. The computer program product of claim 16, wherein the changed portion comprises a change to the application data, wherein transmitting the any changed portion of the at least one web page template and application data comprises transmitting the application data, including the change to the application data, to the mobile client device.

18. The computer program product of claim 14, wherein the application data comprises a plurality of data elements, wherein the changed portion comprises a changed data element, wherein transmitting the any changed portion of the at least one web page template and application data comprises transmitting the changed data element to the mobile client device.

19. The computer program product of claim 14, wherein the changed portion comprises a changed web page template, wherein transmitting the any changed portion of the at least one web page template and application data comprises transmitting the changed web page template to the mobile client device.

20. The computer program product of claim 14, wherein the changed portion comprises a changed executable script called by a web page template, wherein transmitting the any changed portion of the at least one web page template and application data comprises transmitting the changed executable script to the mobile client device.

21. The apparatus of claim 16, wherein the changed portion comprises a change to the application data, wherein transmitting the any changed portion of the at least one web page template and application data comprises transmitting the application data, including the change to the application data, to the mobile client device.

22. The apparatus of claim 16, wherein the application data comprises a plurality of data elements, wherein the changed portion comprises a changed data element, wherein transmitting the any changed portion of the at least one web page template and application data comprises transmitting the changed data element to the mobile client device.

23. The apparatus of claim 16, wherein the changed portion comprises a changed web page template, wherein transmitting the any changed portion of the at least one web page template and application data comprises transmitting the changed web page template to the mobile client device.

24. The apparatus of claim 16, wherein the changed portion comprises a changed executable script called by a web page template, wherein transmitting the any changed portion of the at least one web page template and application data comprises transmitting the changed executable script to the mobile client device.

25. A method for enabling access to data driven websites on a mobile client device, wherein a data driven website includes a plurality of web pages that display data according to a common format, the method comprising:
   synchronizing the mobile client device with a server, the synchronizing comprising:
      transmitting a request for a website from the mobile client device to the server; and
      receiving from the server at the mobile client device at least one web page template and application data corresponding to the website in response to the request;
   displaying a selected web page of the website on the mobile client device, the displaying comprising displaying data of the application data that corresponds to the selected web page formatted according to the at least one web page template; and
   synchronizing the mobile client device with the server a second time, the second synchronizing comprising:
      transmitting a second request for the website from the mobile client device to the server; and
      receiving from the server at the mobile client device a changed portion of the at least one web page template and application data in response to the second request.

26. The method of claim 25, wherein the changed portion includes a changed version of the application data, the method further comprising displaying a second selected web page of the website on the mobile client device, the second displaying comprising displaying data of the changed version of the application data that corresponds to the second selected web page formatted according to the at least one web page template.

27. The method of claim 25, wherein the application data comprises a plurality of data elements, wherein the changed portion comprises a changed data element, the method further comprising displaying a second selected web page of the website on the mobile client device, the second displaying comprising displaying the changed data element corresponding to the second selected web page formatted according to the at least one web page template.

28. The method of claim 25, wherein the changed portion includes a changed web page template, the method further comprising:
displaying a second selected web page of the website on the mobile client device, the second displaying comprising displaying data of the application data that corresponds to the second selected web page formatted according to the changed web page template.

29. The method of claim 25, wherein the changed portion comprises a changed web page template and a changed executable script called by a web page template, the method further comprising displaying a second selected web page of the website on the mobile client device, the second comprising:
displaying data of the application data that corresponds to the second selected web page formatted according to the changed web page template; and
executing the changed executable script called by the changed web page template to format the data for display on the mobile client device.

30. A computer-implemented method for interfacing one or more providers with a mobile client device, the method comprising:
synchronizing, by a server, the mobile client device with the server, the synchronizing comprising:
transmitting, by the server, a request for a website received at the server from the mobile client device to a provider;
receiving, at the server, from the provider at least one web page template of the website and application data corresponding to the at least one web page template in response to the request; and
transmitting, by the server, the at least one web page template and the application data to the mobile client device, wherein the mobile client device can display a plurality of web pages corresponding to the website, each web page displaying data of the application data formatted according to a common format provided by the at least one web page template; and
synchronizing the mobile client device with the server a second time, the second synchronizing comprising:
transmitting, by the server, a second request for the website received from the mobile client device to the provider;
receiving, at the server, from the provider a changed portion of the at least one web page template and application data in response to the second request; and
transmitting, by the server, the changed portion of the at least one web page template and application data to the mobile client device, wherein the mobile client device can use the changed portion to update the at least one web page template and application data stored therein.

31. The computer-implemented method of claim 30, wherein the changed portion comprises a change to the application data, wherein transmitting the changed portion of the at least one web page template and application data comprises transmitting the application data, including the change to the application data, to the mobile client device.

32. The computer-implemented method of claim 30, wherein the application data comprises a plurality of data elements, wherein the changed portion comprises a changed data element, wherein transmitting the changed portion of the at least one web page template and application data comprises transmitting the changed data element to the mobile client device.

33. The computer-implemented method of claim 30, wherein the changed portion comprises a changed web page template, wherein transmitting the changed portion of the at least one web page template and application data comprises transmitting the changed web page template to the mobile client device.

34. The computer-implemented method of claim 30, wherein the changed portion comprises a changed executable script called by a web page template, wherein transmitting the changed portion of the at least one web page template and application data comprises transmitting the changed executable script to the mobile client device.

35. A method for enabling access to data driven websites on a mobile client device, wherein a data driven website includes a plurality of web pages that display data according to a common format, the method comprising:
synchronizing the mobile client device with a server, the synchronizing comprising:
transmitting a request for a website from the mobile client device to the server; and
receiving from the server at the mobile client device at least one web page template and application data corresponding to the website in response to the request;
displaying a selected web page of the website on the mobile client device, the displaying comprising displaying data of the application data that corresponds to the selected web page formatted according to the at least one web page template; and
synchronizing the mobile client device with the server a second time, the second synchronizing comprising:
transmitting a second request for the website from the mobile client device to the server; and
receiving from the server at the mobile client device any changed portion of the at least one web page template and any changed portion of the application data in response to the second request.

36. A method in a server for interfacing one or more providers with a mobile client device, the method comprising:
synchronizing the mobile client device with the server, the synchronizing comprising:
transmitting a request for a website received from the mobile client device to a provider;
receiving from the provider at least one web page template of the website and application data corresponding to the at least one web page template in response to the request; and
transmitting the at least one web page template and the application data to the mobile client device, wherein, the mobile client device can display a plurality of web pages corresponding to the website, each web page displaying data of the application data formatted according to a common format provided by the at least one web page template; and
synchronizing the mobile client device with the server a second time, the second synchronizing comprising:
transmitting a second request for the website received from the mobile client device to the provider;

receiving from the provider any changed portion of the at least one web page template and any changed portion of the application data in response to the second request; and transmitting the any changed portion of the at least one web page template and the any changed portion of the application data to the mobile client device, herein the mobile client device can use the any changed portion of the at least one web page template and the any changed portion of the application data to update the at least one web page template and the application data stored therein.

* * * * *